US012801759B2

(12) United States Patent
Berger et al.

(10) Patent No.: US 12,801,759 B2
(45) **Date of Patent: *Nov. 17, 2026**

(54) METHOD AND SYSTEM FOR DATA FLOW MONITORING TO IDENTIFY APPLICATION SECURITY VULNERABILITIES AND TO DETECT AND PREVENT ATTACKS

(71) Applicant: Dynatrace LLC, Waltham, MA (US)

(72) Inventors: Andreas Berger, Linz (AT); Christian Schwarzbauer, Linz (AT)

(73) Assignee: Dynatrace LLC, Boston, MA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/973,412

(22) Filed: Dec. 9, 2024

(65) Prior Publication Data

US 2025/0103731 A1 Mar. 27, 2025

Related U.S. Application Data

(63) Continuation of application No. 18/539,660, filed on Dec. 14, 2023, now Pat. No. 12,189,786, which is a (Continued)

(51) Int. Cl.

| | |
|---|---|
| ***G06F 21/57*** | (2013.01) |
| ***G06F 21/55*** | (2013.01) |
| ***G06F 21/56*** | (2013.01) |

(52) U.S. Cl.

CPC .......... *G06F 21/577* (2013.01); *G06F 21/552* (2013.01); *G06F 21/566* (2013.01)

(58) Field of Classification Search

CPC ..... G06F 21/577; G06F 21/552; G06F 21/566

See application file for complete search history.

(56) References Cited

U.S. PATENT DOCUMENTS 10,114,970 B2 * 10/2018 Goldfarb ............ G06F 21/6218
10,140,456 B2 * 11/2018 Gorbaty ................. G06F 16/22

(Continued)

OTHER PUBLICATIONS

Haldar V et al.: "Dynamic Taint Propagation for Java", Computer Security Applications Conference, 21st Annual Tuscon, AZ, USA Dec. 5-9, 2005, Piscataway, NJ, USA, IEEE, Dec. 5, 2005 (Dec. 5, 2005), pp. 303-311, XP010869948, DOI: 10.1109/CSAC.2005.21. ISBN: 978-7695-2461-0.

(Continued)

*Primary Examiner* — Stephen T Gundry

(57) ABSTRACT

A technology to identify processing paths of untrusted input data received by applications that are vulnerable to attacks and to further detect and prevent actual attacks that try to exploit those vulnerabilities is disclosed. Application code is augmented at run-time with sensor code which detects the entry of input-data into the application and further traces the propagation, manipulation and, sanitization of this input-data until its usage in a data sink. The so generated data-flow traces reveal data-flow paths that lack required sanitization measures to neutralize potentially harmful input-data. Such data-flow paths are reported as vulnerabilities. Further, input-data that reaches data-sink interfaces is scanned by data-sink sensors to identify harmful input data. On identification of harmful input data, an attack is reported, and countermeasures are applied to prevent the identified attack.

14 Claims, 10 Drawing Sheets

Related U.S. Application Data continuation of application No. 17/481,737, filed on Sep. 22, 2021, now Pat. No. 11,886,599.

(60) Provisional application No. 63/084,759, filed on Sep. 29, 2020.

(56) References Cited

U.S. PATENT DOCUMENTS

| | | | | |
|---|---|---|---|---|
| 10,331,888 | B1 | 6/2019 | Gupta et al. | |
| 10,659,434 | B1 | 5/2020 | Kim et al. | |
| 10,659,462 | B1 | 5/2020 | Kim et al. | |
| 10,698,756 | B1 | 6/2020 | Abdelsalam et al. | |
| 10,789,360 | B2 * | 9/2020 | Johns | G06F 21/54 |
| 10,838,758 | B2 * | 11/2020 | Lee | G06F 9/45558 |
| 10,868,821 | B2 * | 12/2020 | Thomas | H04L 51/212 |
| 10,956,574 | B2 * | 3/2021 | Conikee | G06F 21/566 |
| 10,972,483 | B2 * | 4/2021 | Thomas | H04L 51/212 |
| 11,030,318 | B1 | 6/2021 | Shavro | |
| 11,190,494 | B2 * | 11/2021 | Kim | H04L 63/126 |
| 11,201,894 | B2 | 12/2021 | Liu et al. | |
| 11,283,834 | B2 | 3/2022 | Johns | |
| 11,288,376 | B2 | 3/2022 | Tsai et al. | |
| 11,381,557 | B2 * | 7/2022 | Kim | H04L 63/0209 |
| 11,409,870 | B2 | 8/2022 | Gupta | |
| 11,440,190 | B1 | 9/2022 | Maggi et al. | |
| 11,442,802 | B2 | 9/2022 | Abdelsalam et al. | |
| 11,514,172 | B2 | 11/2022 | Yamaguchi et al. | |
| 11,528,291 | B2 | 12/2022 | Mehandale et al. | |
| 11,886,599 | B2 | 1/2024 | Berger et al. | |
| 2007/0282951 | A1 | 12/2007 | Selimis et al. | |
| 2017/0357810 | A1 | 12/2017 | Gorbaty et al. | |
| 2018/0032314 | A1 * | 2/2018 | Gorbaty | G06F 9/45508 |
| 2018/0107821 | A1 * | 4/2018 | Eshkenazi | G06F 21/52 |
| 2018/0211046 | A1 * | 7/2018 | Muttik | G06F 21/566 |
| 2018/0218155 | A1 * | 8/2018 | Grafi | G06F 21/565 |
| 2018/0316715 | A1 * | 11/2018 | Liu | H04L 63/1466 |
| 2018/0330102 | A1 * | 11/2018 | Siman | G06F 11/3672 |
| 2019/0042762 | A1 * | 2/2019 | Gorbaty | G06F 21/577 |
| 2019/0081976 | A1 * | 3/2019 | Kraft | G06F 12/0813 |
| 2019/0081983 | A1 * | 3/2019 | Teal | G06F 21/50 |
| 2019/0108342 | A1 * | 4/2019 | Conikee | G06F 21/577 |
| 2019/0138725 | A1 | 5/2019 | Gupta | |
| 2019/0171476 | A1 * | 6/2019 | Lee | G06F 9/45558 |
| 2019/0190929 | A1 | 6/2019 | Thomas et al. | |
| 2019/0190936 | A1 | 6/2019 | Thomas et al. | |
| 2019/0228150 | A1 | 7/2019 | Johns | |
| 2019/0306173 | A1 | 10/2019 | Reddy et al. | |
| 2020/0159934 | A1 | 5/2020 | Yamaguchi et al. | |
| 2020/0195687 | A1 | 6/2020 | Johns | |
| 2020/0220894 | A1 | 7/2020 | Liu et al. | |
| 2020/0278900 | A1 | 9/2020 | Abdelsalam et al. | |
| 2020/0349259 | A1 | 11/2020 | Tsai et al. | |
| 2020/0404007 | A1 | 12/2020 | Singh et al. | |
| 2021/0092094 | A1 | 3/2021 | Kim et al. | |
| 2021/0092095 | A1 | 3/2021 | Kim et al. | |
| 2021/0160272 | A1 | 5/2021 | Mehandale et al. | |
| 2021/0209077 | A1 | 7/2021 | Snellman et al. | |
| 2021/0360005 | A1 | 11/2021 | Bae et al. | |
| 2021/0397738 | A1 | 12/2021 | Talreja | |
| 2021/0400071 | A1 | 12/2021 | Ray et al. | |
| 2022/0050904 | A1 | 2/2022 | Sullivan et al. | |
| 2022/0060501 | A1 | 2/2022 | Liu et al. | |
| 2022/0156383 | A1 | 5/2022 | Schwarzbauer et al. | |
| 2022/0207140 | A1 | 6/2022 | Mooney, III | |
| 2022/0215094 | A1 | 7/2022 | Gupta | |
| 2022/0215101 | A1 | 7/2022 | Rioux et al. | |
| 2022/0294816 | A1 | 9/2022 | Martin et al. | |
| 2022/0311794 | A1 | 9/2022 | Maya et al. | |
| 2022/0329616 | A1 | 10/2022 | O'Hearn et al. | |
| 2022/0360594 | A1 | 11/2022 | Cosgrove | |
| 2022/0374303 | A1 * | 11/2022 | Abdelsalam | G06F 21/6254 |
| 2023/0032686 | A1 | 2/2023 | Williams et al. | |
| 2023/0123563 | A1 * | 4/2023 | Yamaguchi | G06F 21/563 726/1 |

OTHER PUBLICATIONS

Anton/'IN Steinhauser et al.: "DjangoChecker: Applying Extended Taint Tracking and Server Side Parsing for Detection of Context-Sensitive XSS Flaws", ARXIV.org, Cornell University Library, 201 Olin Library, Cornell University, Ithaca, NY 14853, May 14, 2020 (May 14, 2020), XP081673755, DOI: 10.1002/SPE.2649.

* cited by examiner

FIG 1: System Overview
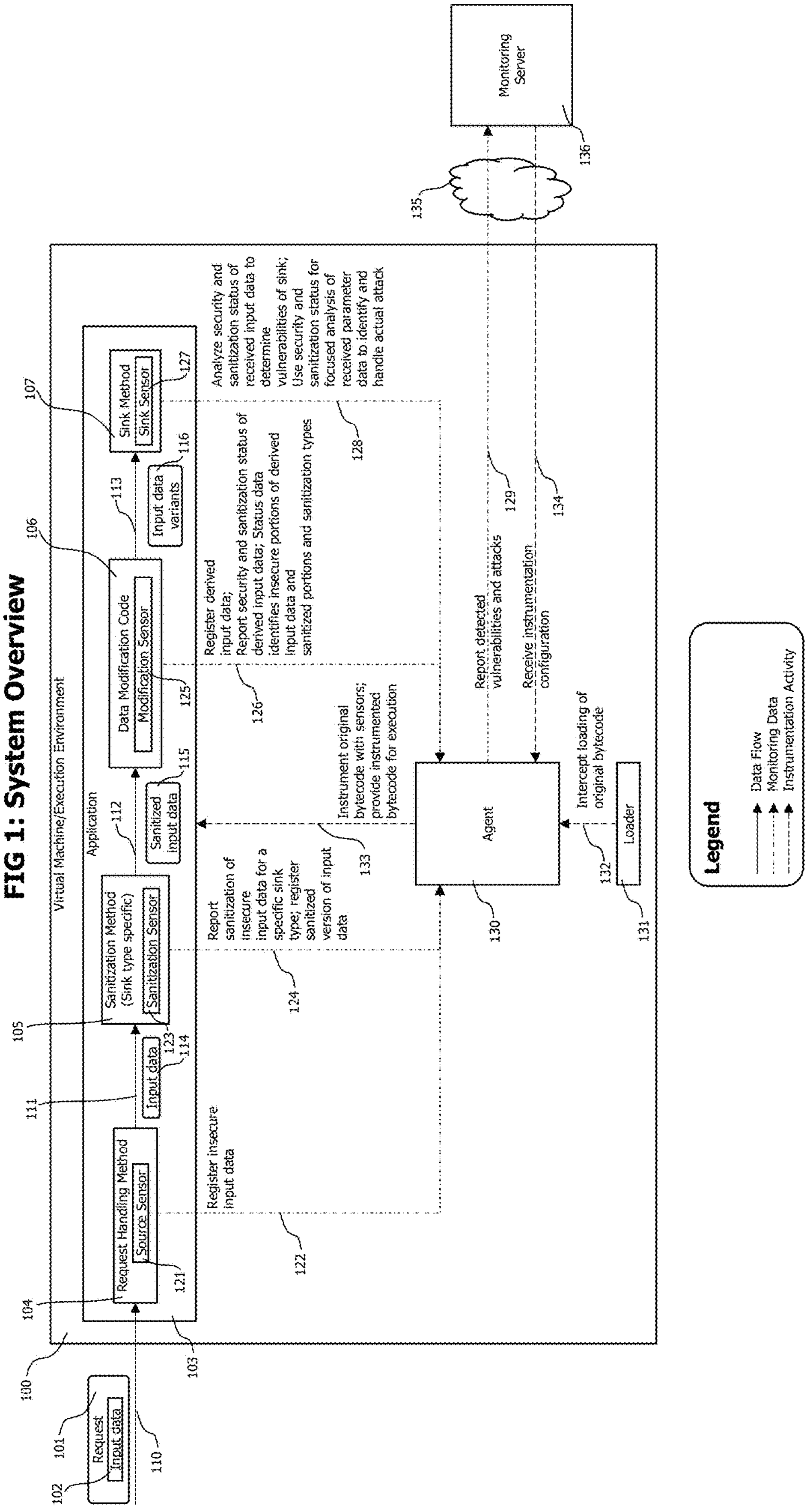

FIG 2: Agent Overview
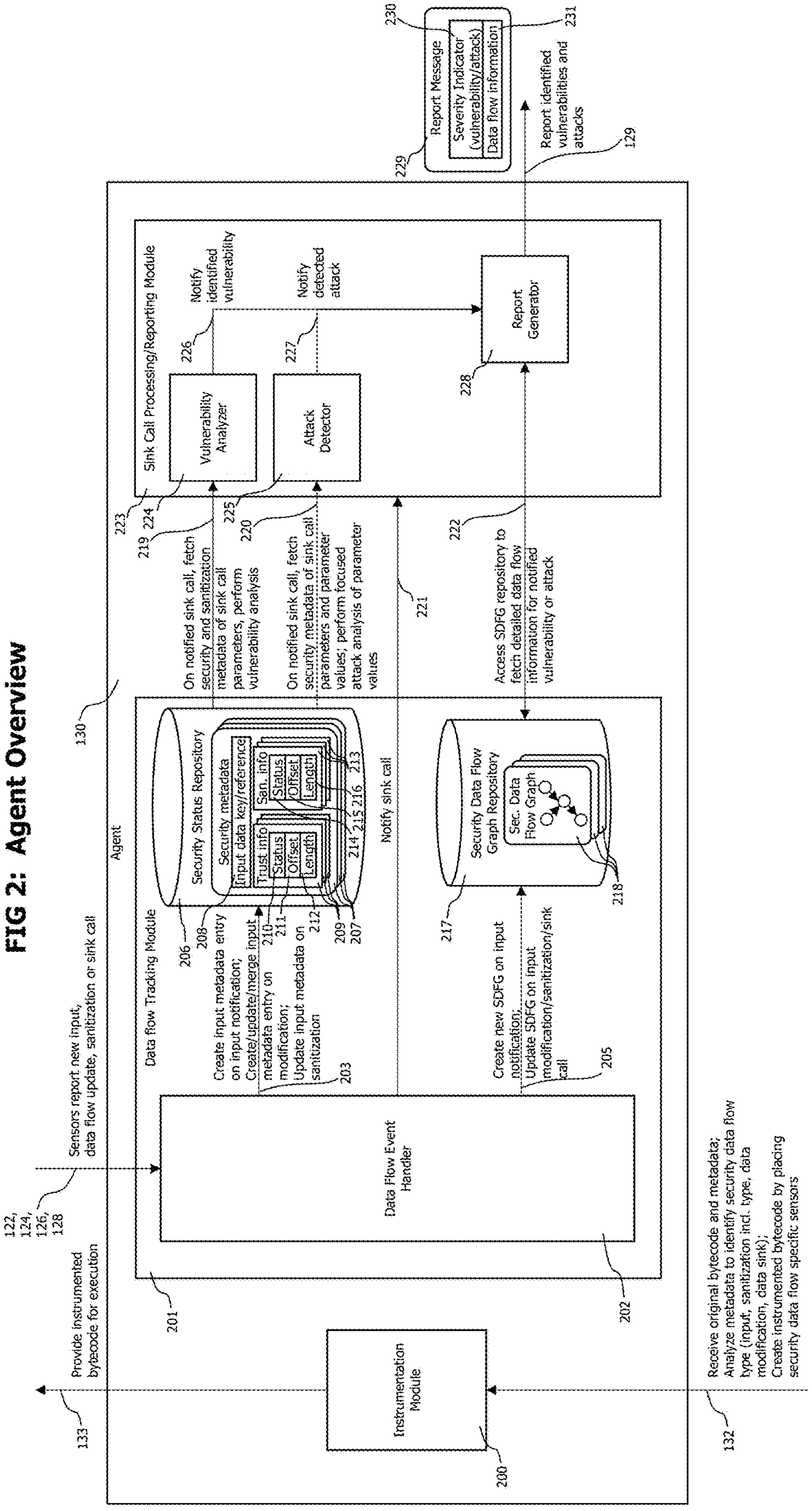

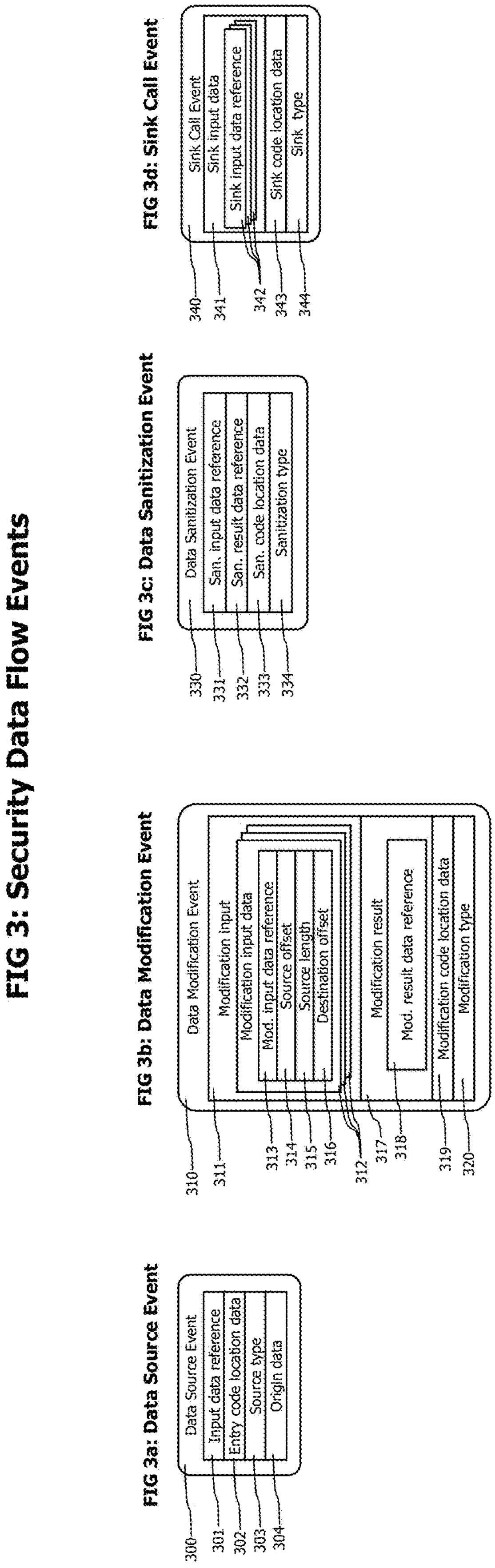
FIG 3: Security Data Flow Events

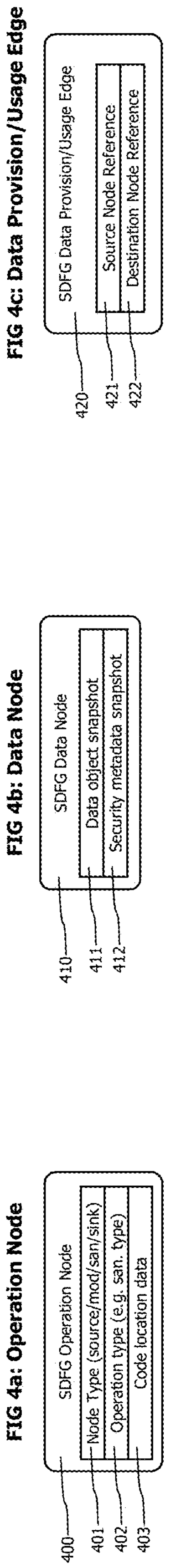
FIG 4: Security Data Flow Graph Records

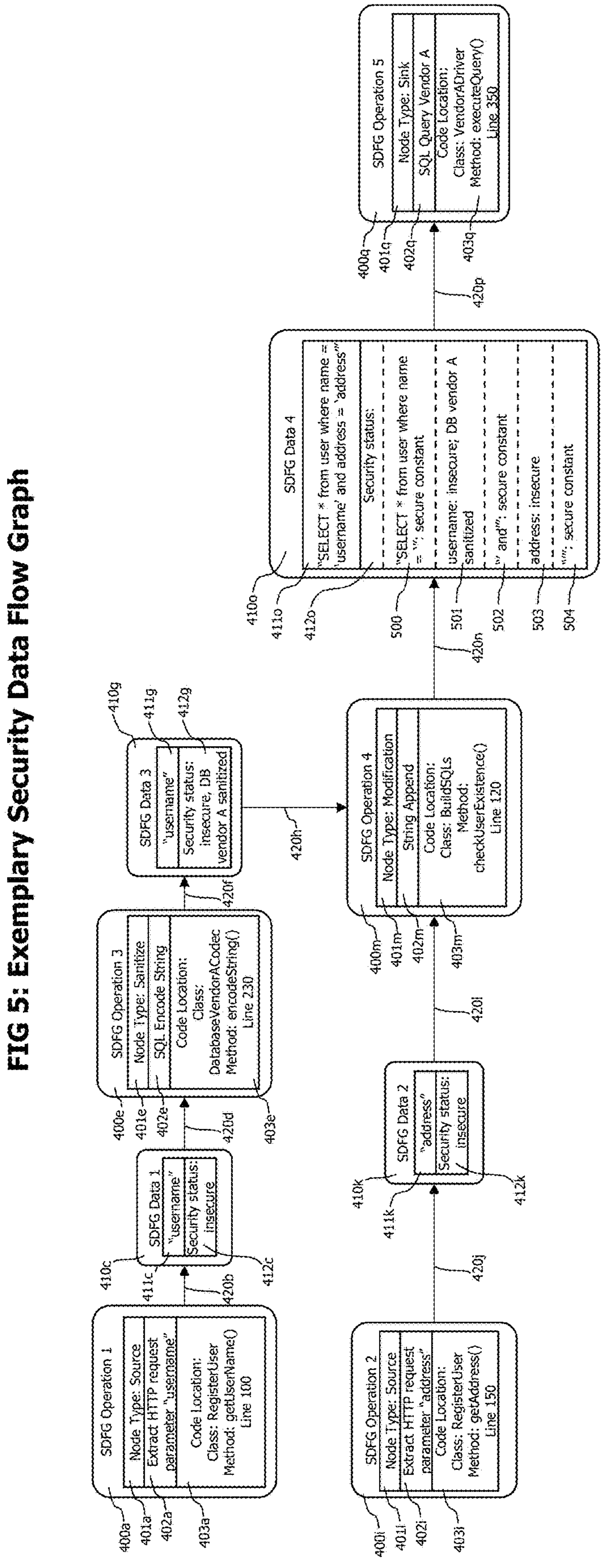

FIG 5: Exemplary Security Data Flow Graph
SDFG Operation 1
Node Type: Source
Extract HTTP request parameter "username"
Code Location: Class: RegisterUser Method: getUserName() Line 100
SDFG Data 1
"username"
Security status: insecure
SDFG Operation 3
Node Type: Sanitize
SQL Encode String
Code Location: Class: DatabaseVendorACodec Method: encodeString() Line 230
SDFG Data 3
"username"
Security status: insecure, DB vendor A sanitized
SDFG Operation 2
Node Type: Source
Extract HTTP request parameter "address"
Code Location: Class: RegisterUser Method: getAddress() Line 150
SDFG Data 2
"address"
Security status: insecure
SDFG Operation 4
Node Type: Modification
String Append
Code Location: Class: BuildSQLs Method: checkUserExistence() Line 120
SDFG Data 4
"SELECT * from user where name = 'username' and address = 'address'"
Security status:
"SELECT * from user where name = '"; secure constant
username: insecure; DB vendor A sanitized
"' and'"; secure constant
address: insecure
"'"; secure constant
SDFG Operation 5
Node Type: Sink
SQL Query Vendor A
Code Location: Class: VendorADriver Method: executeQuery() Line 350
400a 401a 402a 403a 410c 411c 412c 420b 400e 401e 402e 403e 420d 410g 411g 412g 420f 420h
400i 401i 402i 403i 420j 410k 411k 412k 420l 400m 401m 402m 403m 420n
410o 411o 412o 500 501 502 503 504 420p 400q 401q 402q 403q FIG 6: Source, Modification and Sanitization Sensor Executions
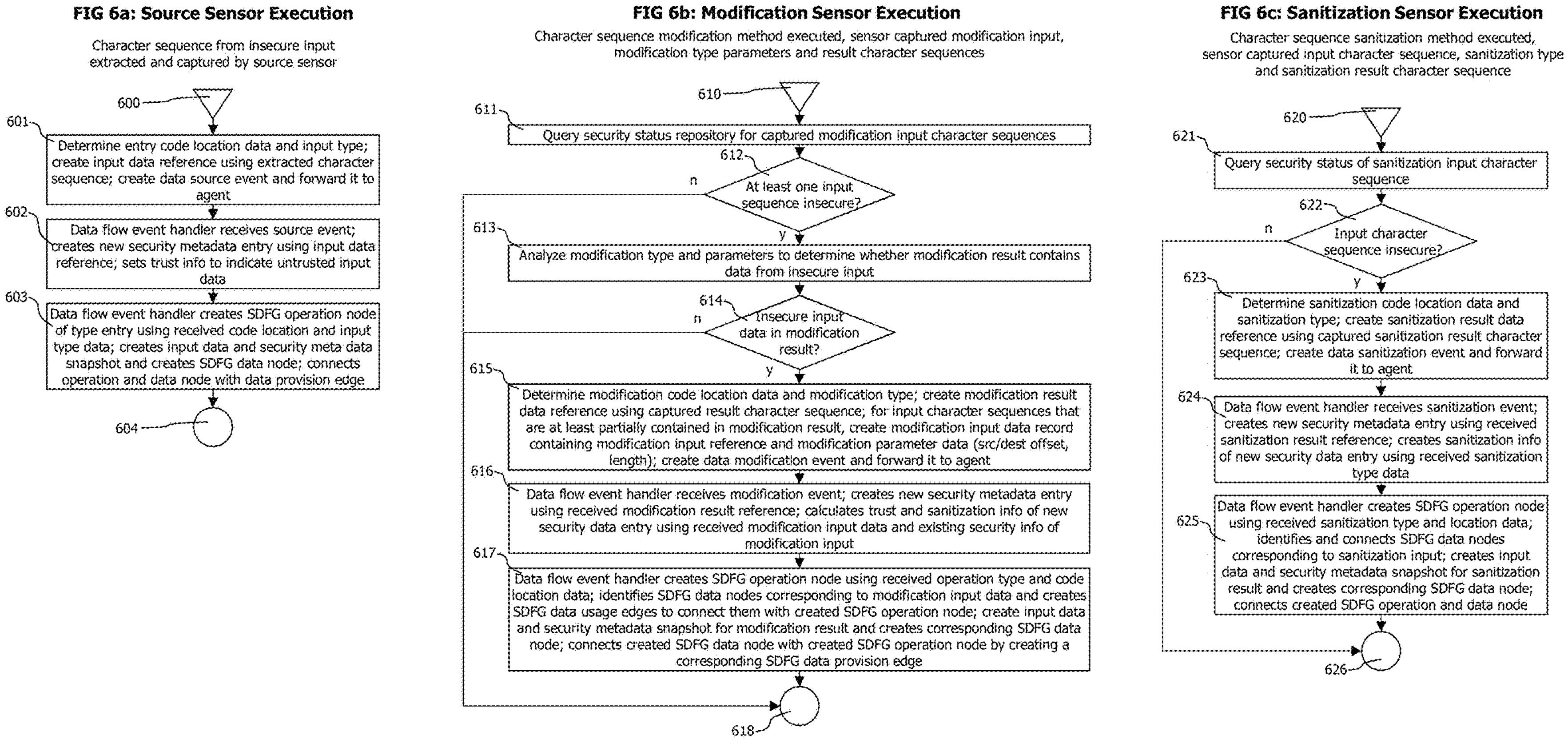

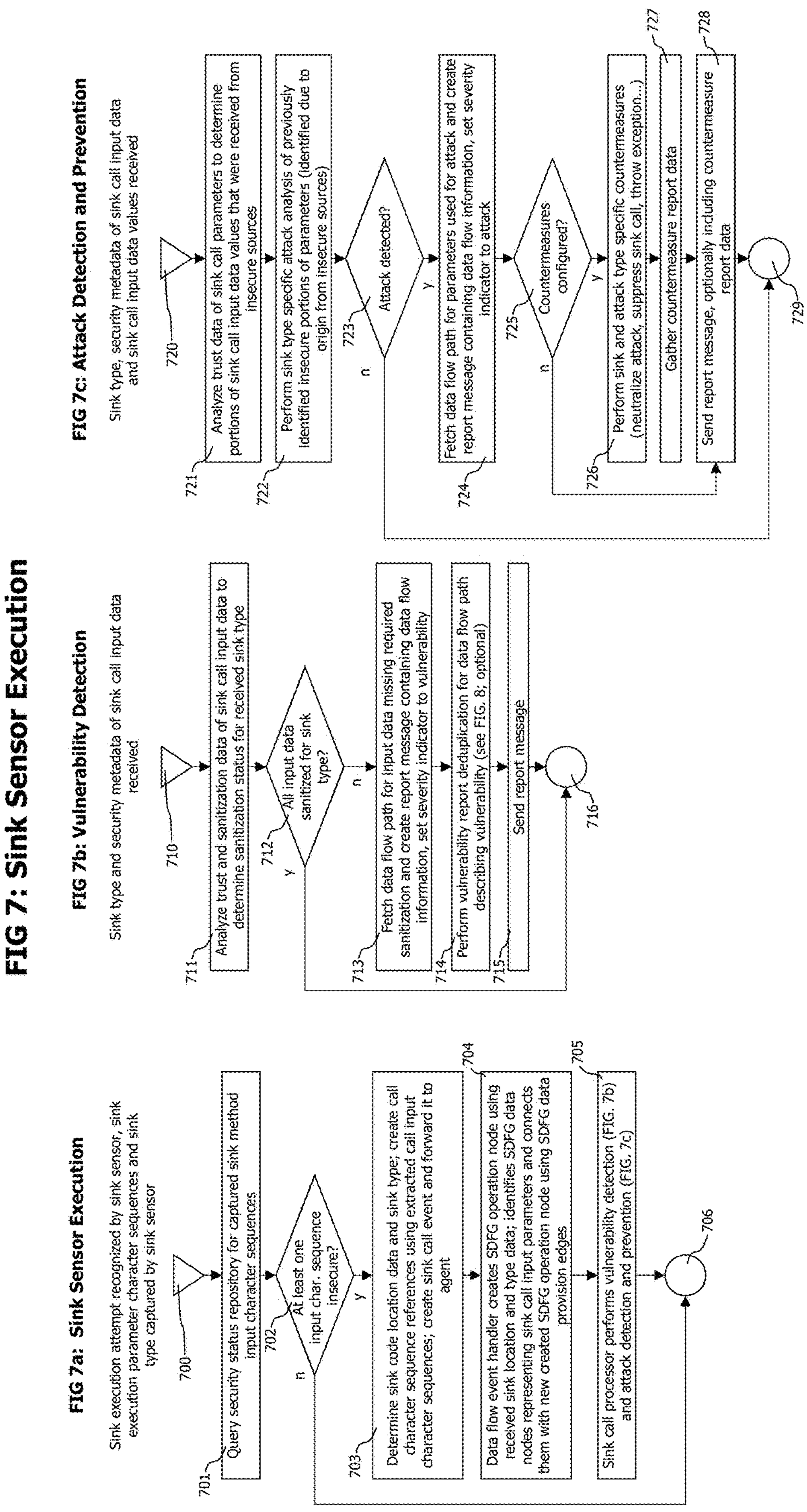
FIG 7: Sink Sensor Execution
FIG 7a: Sink Sensor Execution
Sink execution attempt recognized by sink sensor, sink execution parameter character sequences and sink type captured by sink sensor
700
701
Query security status repository for captured sink method input character sequences
702
At least one input char. sequence insecure?
y
n
703
Determine sink code location data and sink type; create call character sequence references using extracted call input character sequences; create sink call event and forward it to agent
704
Data flow event handler creates SDFG operation node using received sink location and type data; identifies SDFG data nodes representing sink call input parameters and connects them with new created SDFG operation node using SDFG data provision edges
705
Sink call processor performs vulnerability detection (FIG. 7b) and attack detection and prevention (FIG. 7c)
706
FIG 7b: Vulnerability Detection
Sink type and security metadata of sink call input data received
710
711
Analyze trust and sanitization data of sink call input data to determine sanitization status for received sink type
712
All input data sanitized for sink type?
y
n
713
Fetch data flow path for input data missing required sanitization and create report message containing data flow information, set severity indicator to vulnerability
714
Perform vulnerability report deduplication for data flow path describing vulnerability (see FIG. 8; optional)
715
Send report message
716
FIG 7c: Attack Detection and Prevention
Sink type, security metadata of sink call input data and sink call input data values received
720
721
Analyze trust data of sink call parameters to determine portions of sink call input data values that were received from insecure sources
722
Perform sink type specific attack analysis of previously identified insecure portions of parameters (identified due to origin from insecure sources)
723
Attack detected?
y
n
724
Fetch data flow path for parameters used for attack and create report message containing data flow information, set severity indicator to attack
725
Countermeasures configured?
y
n
726
Perform sink and attack type specific countermeasures (neutralize attack, suppress sink call, throw exception...)
727
Gather countermeasure report data
728
Send report message, optionally including countermeasure report data
729

FIG 8: Vulnerability Reporting Deduplication
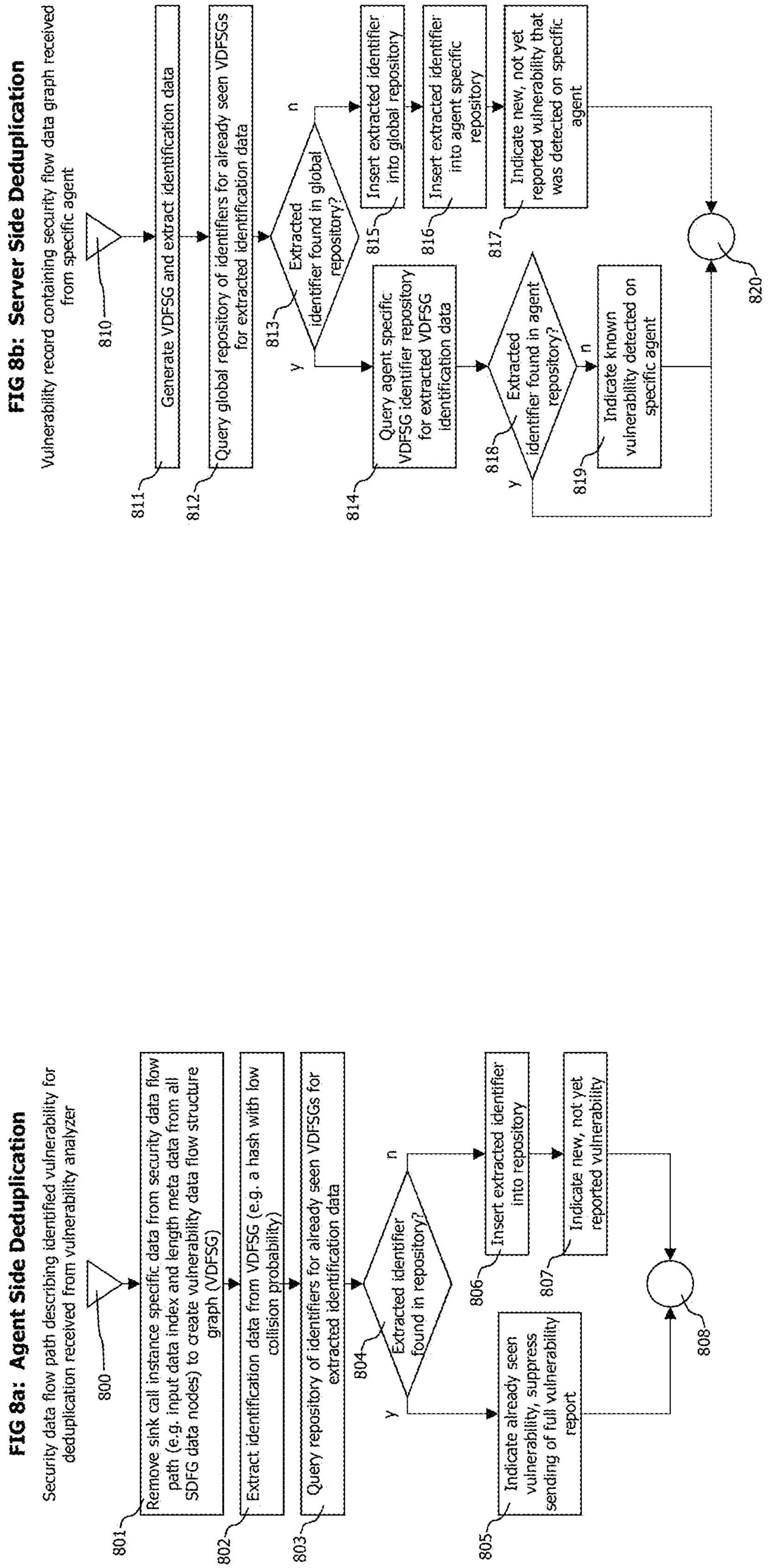

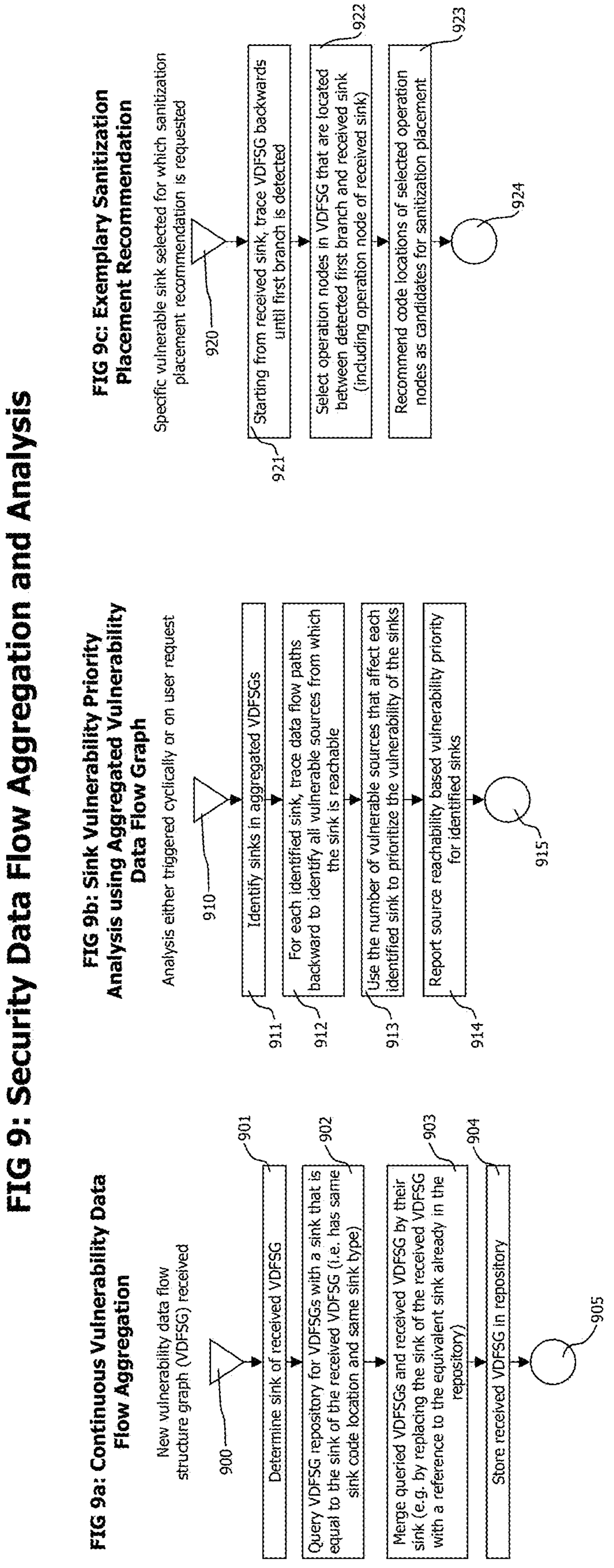
FIG 9: Security Data Flow Aggregation and Analysis
FIG 9a: Continuous Vulnerability Data Flow Aggregation
New vulnerability data flow structure graph (VDFSG) received
900
Determine sink of received VDFSG
901
Query VDFSG repository for VDFSGs with a sink that is equal to the sink of the received VDFSG (i.e. has same sink code location and same sink type)
902
Merge queried VDFSGs and received VDFSG by their sink (e.g. by replacing the sink of the received VDFSG with a reference to the equivalent sink already in the repository)
903
Store received VDFSG in repository
904
905
FIG 9b: Sink Vulnerability Priority Analysis using Aggregated Vulnerability Data Flow Graph
Analysis either triggered cyclically or on user request
910
Identify sinks in aggregated VDFSGs
911
For each identified sink, trace data flow paths backward to identify all vulnerable sources from which the sink is reachable
912
Use the number of vulnerable sources that affect each identified sink to prioritize the vulnerability of the sinks
913
Report source reachability based vulnerability priority for identified sinks
914
915
FIG 9c: Exemplary Sanitization Placement Recommendation
Specific vulnerable sink selected for which sanitization placement recommendation is requested
920
Starting from received sink, trace VDFSG backwards until first branch is detected
921
Select operation nodes in VDFSG that are located between detected first branch and received sink (including operation node of received sink)
922
Recommend code locations of selected operation nodes as candidates for sanitization placement
923
924

FIG 10: Exemplary Distributed Scenario – Suppress Incorrect Vulnerability Warning
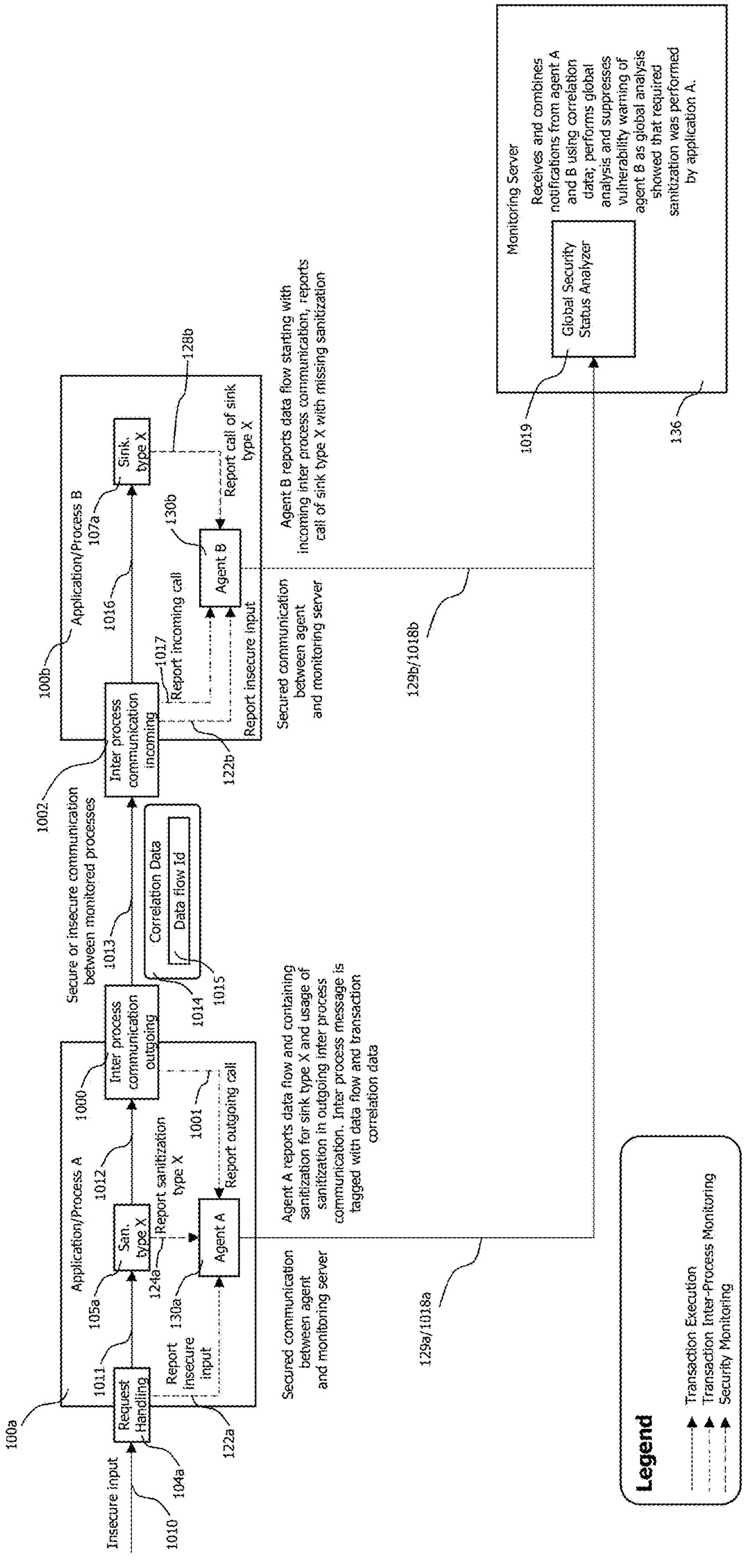

METHOD AND SYSTEM FOR DATA FLOW MONITORING TO IDENTIFY APPLICATION SECURITY VULNERABILITIES AND TO DETECT AND PREVENT ATTACKS

CROSS-REFERENCE TO RELATED APPLICATIONS

This application is a continuation of U.S. patent application Ser. No. 18/539,660, filed on Dec. 14, 2023; which is a continuation of U.S. Pat. No. 11,886,599, filed on Sep. 22, 2021; which claims the benefit of U.S. Provisional Application No. 63/084,759, filed on Sep. 29, 2020. The entire disclosure of the above applications are incorporated herein by reference.

FIELD

The invention generally relates to the field of automatic detection and remediation of application security vulnerabilities and more specific to the usage of instrumentation of application code to trace the flow of data from entry points, via manipulation and sanitization operations to the usage of the data to perform security relevant operations.

BACKGROUND

Current communication technologies like the Internet and web-based application interfaces are enabling new ways of businesses in previously unknown volumes, as they eradicate location, time, and ability related limitations to access and interact with customers. All types of activities, ranging from plain shopping over management of financial assets to accessing and managing health related data may be performed via web-based applications literally from everywhere and at every time.

Although this development is highly appreciated by both application customers and vendors because it increases both convenience for customers and business volume for vendors, it also causes additional risks. As already stated, web-applications provide widely accessible interfaces that may be addressed nearly from everywhere, every time. In addition, to provide convenient customer interaction, those applications typically also store large amounts of customer related data. Parts of this data may be sensitive, like data describing political or religious orientations of users, their financial or health situation. In summary, data that could be used against those users by criminal actors. The combination of relatively easy access and storage of data that can be criminally exploited makes those web-applications lucrative targets for hacking attacks.

Recent developments in application operating and hosting, like the emergence of cloud environments and container based virtualization, together with the broad adoption of the service-oriented architecture paradigm lead application deployments and configurations that are highly elastic and adaptable to changing load situations and that are also highly flexible in terms of updating, adding, or removing features.

This also leads to highly complex and variable application topologies, where the borders between trusted application components and untrusted external elements become blurred and change rapidly.

New software development, delivery, and deployment approaches like e.g., DevOps or continuous integration (CI) aim to better integrate development and operation of software products, to automate development tasks and further to accelerate the pace at which software products are updated and at which those updates get available to end users of the software products. Benefits of those approaches include higher agility and shorter reaction times of software vendors to react on changing customer demands or emerging malfunctions, as functionality and performance related code changes may deployed in a rapid, but still safe and organized way. However, this also means that the code base that is operated in publicly accessible application rapidly changes, which also constantly and rapidly changes the threat profile of those applications.

The discussed changes and developments in deployment, development and operation of software products generate new challenges for security analysis, monitoring and protection systems.

For traditional static code analysis based or security testing systems, that either analyze source code to identify vulnerabilities on source code level, or security testing systems that expose test installations to defined attack situations to verify the handling of those attacks by the tested system have difficulties to cope with the high update frequency of modern software applications. Often static analysis or test results are rendered obsolete before they are even finished due to the availability of a further product update.

Known external protection tools like fire wall systems that monitor and analyze traffic that is directed to supervised systems to identify and reject malicious input are facing similar challenges, as those systems typically require complex, manual configurations to adapt them to the needs of protected applications. The above discussed rapid changes of application deployment and functionality would require manual changes of configuration data of a firewall or other external protection system that is adapted at the same pace. A task that quickly becomes unmanageable.

As a consequence, there is demand in the filed for a protection system that automatically and independently hardens and immunizes application components (i.e., processes) themselves during run-time, without the need to perform additional analysis, security tests or the requirement to keep external protection systems in sync.

This section provides background information related to the present disclosure which is not necessarily prior art.

SUMMARY

This section provides a general summary of the disclosure, and is not a comprehensive disclosure of its full scope or all of its features.

This disclosure describes technologies related to the usage of dynamic, run-time or load time instrumentation of code to identify vulnerabilities of executing code during runt-time and, in case of attacks, e.g., in form of malicious input data, to detect and prevent those attacks.

Embodiments of the disclosed technologies may identify portions of code that is loaded for execution and also the purpose that those code portions serve, like the receipt of input data from external sources, the manipulation data, the sanitization data, to neutralize potential malicious data and code that uses data to interact with data sinks like data base systems or communication systems that send messages to other processes.

Specific sensors may be placed to different types of identified code, like sensors detecting the entry of data into a monitored system, sensors detecting the manipulation or sanitization of data and sensors that detect the usage of data to interact with data sinks.

Those sensors may in addition mark received input data and trace the propagation of the input data via manipulation and sanitization code until it may reach a data sink.

Meta data may be maintained for received input data that tracks its trust and sanitization status while it propagates through the monitored system.

When data reaches code that interacts with a data sink, its trust and sanitization status may be checked to determine whether unchecked/not sanitized data reaches the data sink. Detection of not sanitized input data at data sinks may be reported by the monitoring system as vulnerability.

Variant embodiments may in addition, on receipt of input data at a data sink, perform analyses of the received input data to determine whether it contains malicious data that may cause undesired disclosure of secret data or undesired deletion, manipulation of stored data or other malicious usage of stored data. Counter measures may be applied on detected attacks, including the suppression of input containing malicious data, terminating the processing of malicious data by e.g., throwing an exception or by simply reporting the observed attack.

Yet other variant embodiments may, for received input data, maintain a data manipulation and sanitization graph, that represents the paths on which data was transferred through a monitored system. The data manipulation and sanitization graph may be visualized and presented to a user of the monitoring system as a tool to identify e.g., missing sanitization of input data and as guidance to determine code locations to place missing sanitization code.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1 shows a block diagram of a monitoring system consisting of an agent injected into a monitored application and a monitoring server receiving monitoring data from the agent. The agent places various types of sensors in the code of the application that monitor receipt, propagation, manipulation, and usage of input-data by the application.

FIG. 2 provides a block diagram of a monitoring agent that may be injected into a monitored application. The monitoring agent provides functionality to instrument application functionality with sensors, to track the flow of input-data through the application and the usage of input-data to interact with data-sinks, like e.g., databases.

FIG. 3 described data records that may be used to describe data-flow activities, like the receipt of input data, its manipulation, sanitization, and its usage to interact with a data-sink.

FIG. 4 shows data records that may be used to describe operations on traced data and the state of the data before and after the operations in form of data-flow graphs.

FIG. 5 depicts an exemplary data-flow graph describing monitored input-data manipulations and usages.

FIG. 6 provides flow charts of the processing performed by source, modification, and sanitization sensors.

FIG. 7 shows flow charts that describe the processing performed by sink sensors.

FIG. 8 shows flow charts of processes performed on the agent and on the monitoring server to identify and suppress notifications for already reported vulnerabilities.

FIG. 9 provides flow charts for an automated aggregation and analysis of received data-flow graphs describing identified vulnerabilities. One result of the performed analyses are recommendations for code locations to place missing sanitization code.

FIG. 10 provides a block diagram of a distributed application in which sanitization and corresponding sink-calls are performed on different application nodes. An agent that observes only application-local input-data processing may in such situations generate false-positive vulnerability reports. A centralized security analyzer located on the monitoring server and receiving data from all agents may identify and suppress those false-positive alerts.

Corresponding reference numerals indicate corresponding parts throughout the several views of the drawings.

DETAILED DESCRIPTION OF EXEMPLARY EMBODIMENTS

Example embodiments will now be described more fully with reference to the accompanying drawings.

To determine the vulnerability status of application components, like e.g., processes executing application code in real-time, it is required to monitor all data received by the application component and track this data, including all manipulations of the received input data until it reaches critical functionality, like e.g., code that interacts with a data sink like a database management system.

Various portions of monitoring code, also referred to as sensors, needs to be executed in combination with payload code of the monitored application that provides customer desired functionality. The functionality of this monitoring code is independent of payload code, and it is desired to separate development of payload code from the placement of monitoring code in the payload code. Therefore, instrumentation of payload code may be performed by manipulating payload code at run-time of the application e.g., when the payload code is loaded for execution.

An agent may be deployed to a monitored application and configured to monitor the loading of code for execution, to analyze meta data describing the loaded code to identify the purpose of the code and inject corresponding sensor code to the loaded code. The sensor code may then detect the receipt, manipulation, sanitization, and usage of input data. Further, placed sensors and the agent may cooperate to track the propagation of input code through the monitored application.

Coming now to FIG. 1, which provides a conceptual overview of a security monitoring system consisting of an agent 130 that is deployed to an execution environment 100 like e.g., a process. The process may execute a virtual machine which in turn executes code directed to the virtual machine to provide desired functionality. The agent 130 places sensors (e.g., 121, 123, 125 and 127) to application code and receives monitoring data describing receipt, manipulation, and usage of input data from those sensors. The agent may forward 129 received monitoring data to an external monitoring server 136 for analysis. The monitoring server may send configuration data 134, including instrumentation configuration data to the agent to configure the placement of sensors. The exchange of monitoring and configuration data between agent 130 and monitoring server 136 may be performed via a connecting computer network 135.

A loader 131 may be used by a virtual machine to load code for execution e.g., from a hard disk. The agent 130 may be configured to get notified on such loading activities and may intercept 132 loaded code for manipulation before its execution is started. The agent may use meta-data describing the loaded code, like the name of a class that is loaded, object oriented inheritance or interface implementation data, names of methods of the class, the signatures (i.e. sequence of method parameters and their types and types of return values), annotations of classes or methods, or the names of packages containing the loaded class or other structuring data, to determine type and purpose of the loaded code and then manipulate the loaded code by placing sensors 133 according to the determined type and purpose of the code.

As an example, code identified by the agent as responsible to receive external requests containing input data may be instrumented with source sensors that capture received input data and that register input data or data structures containing the received input data for data-flow tracing.

In some variants, the agent may also manipulate already loaded classes, e.g., in response to the receipt of changed instrumentation configuration data.

An application 103 may contain code that receives incoming request, like request handling method 104. A source sensor 121 may be instrumented into the request handling method by the agent, e.g., when the code of the request handling method is loaded.

On receipt 110 of a request 101 containing input data 102 from an external source, the request handling method 104 may process the request and extract input data 114. The source sensor 121 may also be executed during the processing of the request, detect the extraction of the input data 114 and register 122 the new input data with the agent 130.

A sanitization method 105, which provides methods to neutralize potential malicious portions of receive input data may afterwards receive 111 the input data. Sanitization is performed with respect to usage in specific data sinks. Sanitization directed to the usage of sanitized data by a data base may be different to sanitation directed to the usage of sanitized data e.g., to create the content of a web page. The sanitization may analyze and manipulate the received input data 114 to neutralize potential vulnerable portions of the received input data for a specific type of data sink. The sanitization method may create a sanitized version 115 of the input data.

A sanitization sensor 123 may be injected into the sanitization method 105 by the agent. The sanitization sensor may detect the sanitization processing and report 124 the performed sanitization of the insecure input data for the specific data sink. The sanitization sensor 123 may further register 124 the created sanitized input data 115 with the agent for data flow tracing. The registration may also contain data describing the changed sanitization status of the created sanitized input data 115.

The sanitized input data may then be forwarded 112 to data modification code 106, which uses the received input data to create a variant of the input data that is capable for the interaction with a data sink. The data modification code may e.g., form data query or manipulation commands capable to request or manipulated data stored in a database system, or it may create a markup/hypertext document to be sent to an external browser for visualization and user interaction. In all cases, the crated input data variants 116 may contain all or a portion of the received input data 114 or a sanitized variant 115 of the received input data. A modification/tracking sensor 125 may be injected into the data modification code 106, which tracks the modification steps performed by the data modification code. The modification/tracking sensor may register 126 created derived input data variants 116 for further data flow tracking and may also generate and report security and sanitization status data for the derived input data variants. The security and sanitation status data may specify which portions of the created input data variants correspond to received input data, and which of those portions were sanitized for which type of data sink usage.

Created input data variants 116 may be forwarded 113 to data sink methods 107 for interaction with a data sink, like a data base system or a response sending method that sends created content data to a web browser.

A sink sensor 127 may be injected into sink methods 107 and register the receipt of input data variants and their usage to interact with data sinks. Sink sensors may analyze the security and sanitization status of received input data variants to determine whether all input data contained in the received input data variants was sanitized according to the type of the receiving data sink. The sink sensor 127 may report 128 a vulnerability status of the data sink call 113 addressed to the data sink method 107 into which it is injected according to the sanitization status of received and analyzed in input data variants. The sink sensor may analyze trust information 207 for received call parameters to determine a vulnerability status, The sink sensor 127 may further use the security and sanitization status of the received input data variants to perform a focused analysis of the received input data variants to detect actual ongoing attacks. The sink sensor may e.g., select those portions of received input data variants that correspond to received input data 102 and perform analysis directed to the identification of malicious data only for those portions. Identified attacks may also be reported 128 to the agent. The sink sensor may, in some embodiments, also perform countermeasures to prevent detected attacks. Sink sensor may either perform an on-demand sanitization of identified malicious data, prevent the potentially malicious interaction with the data sink but otherwise continue normal program execution, or terminate normal program execution before the interaction with the data sink is performed, e.g., by throwing an exception.

Coming now to FIG. 2 which provides a block diagram of the components of the agent 130.

An agent 130 may contain an instrumentation module 200, a data flow tracking module 201 and a sink call processing/reporting module 223.

The instrumentation module 200 may receive original code or bytecode that was loaded by a loading mechanism 131 to load code or bytecode for execution. The instrumentation module may be configured to get notified on loading of code to receive the loaded code, together with metadata of the loaded code.

On a received loading notification 132, the instrumentation module may analyze the metadata describing the loaded code. The metadata may e.g., contain a name of a class identifying the portion of loaded code and the names and signatures of methods specifying portions of individually addressable and executable functionality of the loaded code, as well as other meta data relating to object-oriented inheritance and interface implementation relations or annotations as discussed earlier. The instrumentation module may use the received metadata to determine type and purpose of loaded code (e.g., input receiving code, sanitization code, data manipulation or data sink interaction code) and inject corresponding sensors into the loaded code to create instrumented code. The created instrumented code may then be forwarded 133 to the application for execution, instead of the originally loaded code.

The data flow tracking module 201 receives updates regarding the receipt, manipulation, sanitization, and sink-usage of input data and maintains a security and sanitization status of tracked input data. It may in addition maintain graph representations of the monitored flow of input data through the application.

The data flow tracking module may receive data flow notifications regarding the receipt of input data 122, the sanitization of data 124, the manipulation of data 126 and the usage 128 of data to interact with data sinks.

A data flow event handler 202 may receive all those notifications and update security metadata records 207 contained in a security status repository 206, and security data flow graphs 218 in a security data flow graph repository 217 accordingly.

The data flow event handler 202 may e.g., on receipt of a notification indicating the receipt of input data, create a new input security meta data entry 207 for the new input data. A reference to the input data may be used as input data key/reference 208 of the created security meta data entry 207 which may be stored in the security status repository 206.

Modern application execution environments typically provide automated memory management or garbage collection services which automatically detect when data objects are no longer referred and therefore no longer used. Such data objects are automatically reclaimed, and the memory used by those objects becomes available for the creation of new data objects. For fine grained access and object lifetime management, such systems may distinguish between hard references to an object, which prevent the reclaim of an object and weak references which provide access to an object, but which do not prevent a reclaim of the object by an automated memory management system. Simplified, an object is not reclaimed until at least one hard reference points to it. After the last hard reference is removed, it is reclaimed and all weak references to the object may be reset to notify the owner of the weak reference that the referred object no longer exists. Different variants of weak references exist, including soft references or phantom references. The main differences between those variants are the conditions that are required for a collection of referred objects.

The input data key/reference field 208 of security metadata records may be implemented using weak references to reduce the impact of the monitoring activity on the memory management behavior of the monitored system. As long as an input data is referred by application code, also its corresponding key/reference field 208 remains valid. After the input data is no longer used and is reclaimed, its corresponding input data key/reference field 208 becomes invalid, and the security metadata record 207 containing the invalid key/reference field may be removed.

Besides the input data key reference 208, which links a data object with its security metadata, a security metadata entry 207 may contain but is not limited to a set of trust info records 209 and a set of sanitization info records 213. Both trust info records 209 and sanitization info records 213 may contain data identifying subsets of a referred data object, e.g., in form of an offset 211/215 and a length 212/216 and status info 210/214 specifying the trust/sanitization status of the identified subset of the data object. Various layouts of security metadata records are possible, like the variant described in FIG. 2. An alternative variant may instead combine trust and sanitization info into one record, where this one trust and sanitization record may also contain data identifying a subset of a referred data object (in form of offset and length) and separate status data sections for the trust and the sanitization status.

The data flow event handler may also create a trust information entry 209 for the security metadata entry indicating that the whole input data is untrusted.

Typically, input data is received in form of character sequences or strings, where each portion of the character sequence or string can be addressed by an offset 211 from the start of the string which specifies the start of an addressed portion relative to the start of the containing string and a length 212 specifying the size of the addressed portion.

The data flow event handler may, to indicate that the whole new input data is untrusted, create a trust information entry 209 with a status set to "untrusted", an offset set to 0, or another value indicating the start of the input data and a length indicating the length or size of the new input data.

Further, the data flow event handler may create a new security data flow graph 218 indicating the receipt of new input data. It may e.g., create an operation node 400 indicating where (i.e., which code portion) the input data was received, and a data node 410 describing the received input data. Both nodes may be connected with a data provision/usage edge indicating that the input data was created by the described code portion. For details of data records to represent security data flow graphs and for an exemplary security data flow graph, see FIGS. 4 and 5.

The agent architecture proposed in FIG. 2 uses a security status repository 206 to store security metadata about processed data objects like strings and uses an input data key/reference 208 to link data objects with corresponding security metadata entries. Alternative embodiments may instead instrument one or more fields into data objects to store security metadata directly in those data objects. Technologies and processing described in this disclosure would be the same for both variants, except that in the first variant security metadata would be queried from a security status repository and in the second variant it would be accessed via the fields instrumented to the data objects. Technically, a centralized security status repository has the advantage that original data objects remain unchanged and additional memory is only required for security relevant/untrusted data object. The instrumentation variant would add additional security metadata fields to all data objects, regardless if the data object correspond to untrusted input data, which may increase the memory footprint of the monitoring solution more than necessary.

On receipt of notification data from a modification/tracking sensor 125 indicating the creation of new data out of received input data, e.g., by the split of input data into multiple data records, the merge of input data with other data records or the manipulation of input data, the data flow event handler may create new or update existing security metadata entries accordingly. On a merge operation, a new security metadata entry to represent the data record that was the result of the merge operation may be created. Trust information data 209 and sanitization information data from security metadata references corresponding to data records that were input to the merge operation may be merged to represent the trust and sanitization status of the new created data record.

As an example, when an untrusted input data record is appended to a trusted data record that was created internally by the application, a trust information record 209 will be created for the security metadata record for the data record representing the result of the append operation which has the same length 212 and status 210 as the trust information record of the input data record that was used as input of the append operation, but the offset of the new trust information record 209 may be set to indicate the position of the new data record on which the data from the input data record was inserted.

Similar merge operations may be performed for sanitization information records to correctly describe the sanitization status of data records that were created by modification operations.

Monitored and reported manipulation operations may include but are not limited to split, merge, replace or trim operations. Corresponding changes of existing corresponding security metadata records or creation of new security metadata records may be performed by the data flow event handler 202 on receipt of update notifications.

The data flow event handler 202 may, on receipt of update notifications also update security data flow graphs accordingly, e.g., by adding new operation nodes 400 describing the performed operation and the portion of code that performed the operation and data nodes 410 for the data records that resulted from the modification operation. Data provision/usage edges 420 may also be added to connect the operation node with data nodes representing the input of the operation and with data nodes representing the results of the operation.

Similar processing may be performed on the receipt of notifications indicating the sanitation of data objects. In this case, sanitization information records 213 may be created in security metadata records representing the sanitized data object. The status 214 field may indicate the type of the sanitation and offset 215 and length 216 the portion of the data object that was sanitized. Typically, sanitization methods sanitize whole received data objects, a recorded sanitization status indicating the sanitization of only a portion of a data object is typically caused by a sanitization of a data object that is followed by a modification that merges the sanitized data object into another data object.

Sanitization activities may also be represented in security data flow graphs as operation nodes representing the performed sanitation, data nodes 410 representing the sanitized data objects and data provision/usage edges describing the relations between input data, sanitization operation and created sanitized data object.

On the receipt of sink call notifications, the data flow event handler may first perform a corresponding security data flow graph update to also describe the data flow to the sink call. Afterwards, it may notify 221 the sink call processing/reporting module 223 of the performed sink call. A vulnerability analyzer 224 may fetch security metadata records 207 that represent the data objects that were used for the sink call from the security status repository 217. The vulnerability analyzer may e.g., query the security status repository 206 for security metadata records 207 with an input data key/reference 208 matching the data objects that were used for the sink call.

Afterwards, the vulnerability analyzer may for each fetched security metadata record 207 compare the areas that are marked as untrusted by trust information records 209 with the areas that are marked as sanitized for the type of the receiving sink by sanitization information records 213. In case all areas that are marked as untrusted are also marked as sanitized for the type of the receiving sink, the vulnerability analyzer may indicate no vulnerability of the called sink. In case a portion of untrusted data is not properly sanitized, a vulnerability may be notified 226 to a report generator 228.

In parallel, an attack detector 225 may also fetch security metadata records 208 corresponding to data objects used for the sink call and use trust information records to identify portions of data objects that were used in the sink call that originated from untrusted input data. The attack detector may then perform a sink type specific analysis of the identified input data to detect malicious sequences in input data. A currently ongoing attack is notified 227 to a report generator 228 in case malicious data is detected. The attack detector may in this case also initiate countermeasures to prevent or mitigate the detected attack.

The report generator may, on the receipt of vulnerability 226 or attack 227 notifications access the security data flow graph repository 217 to fetch security data graphs 218 describing the data flow sequences that led to the identified vulnerability or attack.

A report message 229 may afterwards be created by the report generator and sent to a monitor node 136. The report message 229 may contain a severity indicator 230 which indicates whether a vulnerability or an attack was detected, and data flow information 231, e.g., in form of a security data flow graph 218 that describes the data flow and processing that led to the detected vulnerability or attack.

Data records that may be used to transfer monitoring data from various types of sensors 121, 123, 125 and 127 to an agent 130 are described in FIG. 3.

A data source event record 300, which may be used by a source sensor 121 to notify the receipt of new input data is shown in FIG. 3*a*. It may contain but is not limited to an input data reference filed 301, which contains a reference to the received input data object, e.g. in form of a weak reference, an entry code location data field 302, which specifies the portion of code that received the input data object, e.g. in form of the name of the method that extracted the input data object from a received request and the name of the class containing the method, a source type field 303, specifying the type of request from which the input data was extracted and the portion of the request from which the request was extracted and an origin data field 304, specifying the network endpoint from which the request that contained the extracted input data was received. In addition, origin data may also contain data describing the URL requested by the incoming request or other data describing the incoming request.

Entry code location data 302 may in some embodiments also contain call stack data describing the nested method calls that were e.g., triggered by a received request and that led to the extraction of the observed input data.

Examples of source type data 303 may include HTTP requests or remote method invocation (RMI) requests. Depending on the type of the received request, additional type specific detail data may be contained in the source data type like e.g., for HTTP requests whether the input data was extracted from a query string or a header value and data further identifying a portion of the query string, or the name of the header used to extract the input data. For RMI requests this additional type specific detail data may contain the name of the method that should be invoked and the class containing this method and name and type of the received method parameter that contained the input data. Code portions receiving and processing external input, like request handling methods, may, in some cases, create not only one data object but a plurality of data objects. In such situations a placed source sensor 121 may either create multiple data source events, where each created data source event corresponds to one created data object. Alternatively, a variant of a data source event capable to describe multiple created data objects (e.g., by containing a set of input data references instead of a singe one) may be created in such situations.

A data modification event record 310, which may be used by a modification/tracking sensor 125 to report an observed modification of input data, is shown in FIG. 3*b*.

A modification event record 310 may contain but is not limited to a modification input section 311, specifying one or more data objects that were used by the modification and their contribution to the created modification output, a modification result section 317 referring to the result of the monitored data modification, code location data 319 of the observed modification, including e.g. method name, class and call stack data and a modification type section 320 describing the type of performed modification.

A modification input data section 311 may contain multiple modification input data records 312, each modification input data record may contain but is not limited to a modification input data reference 313 referring a data object that was used as input for the recorded modification, a source offset 314 and a source length 315 field, identifying the specific portion of the data object that was used by the modification and a destination offset 316 specifying the location of the result object that was influenced by the input data.

A modification result section 317 may contain but is not limited to a modification result data reference 318 which refers the data object that was created as a result of the monitored modification, e.g., in form of a weak reference.

Example modification types may contain but are not limited to split, append, replace, or insert.

Similar to code portions receiving and processing external data, also data modification code 106 may create not only one but multiple result data objects. Also in this case, the corresponding sensor 125 may either create a separate data modification event for each created modification result, or it may create a variant of a data modification event capable to describe multiple data modification results, which may contain a set of modification results instead of only one. In this case, modification input data 312 may require an additional field specifying and identifying a corresponding modification result.

Coming now to FIG. 3*c*, which describes a data sanitization event record 330 which may be used by sanitization sensors 123 to report a sanitization operation that was performed on a data object.

A data sanitization event record 330 may contain but is not limited to a sanitization input data reference 331 referring to the data object that was input of the sanitization operation, a sanitization result data reference 332 referring to the data object that was created by the sanitization operation, and a sanitization code location data section 333 identifying and describing the code portion (e.g. method and class name) and call context (e.g. call stack data) that was used to perform the sanitization operation and a sanitization type field 334 describing the type of the performed sanitizations.

Malicious input data typically tries to inject executable code, e.g., in form of database queries or scripts into data that is processed by data sinks. To achieve this, data sink specific notations are inserted into input data which separates data that is identified as input data by the data sink from data that is identified as executable command or script. Those notations differ between different types of data sinks (e.g., data base, hypertext document, operating system/file system interaction). For specific data sink types, those notations may further differ between different products and vendors. Example problematic notations include for data base systems notations that start/end comments and that start a new query or update command, for hypertext documents tags that enclose executable scripts and for operating system/file system interactions notations that change a current working directory and that trigger the execution of a command by the operating system.

Sanitization operations are typically directed to neutralize potential malicious input data in view of a specific type of data sink. Some sanitization operations may even only effectively neutralize malicious input data for specific vendors/products. A sanitization that is e.g., performed for a sink of type data base may be inefficient for a sink of type of hypertext document. Therefore, it is important for a monitored sanitization operation to also report the type of sanitization that was performed. Example sanitization types reported by the sanitization type 334 may include data base (optionally including a specific data base product/vendor to which the sanitization is directed), hypertext document (optionally including a specific hypertext language/format to which the sanitization is directed, like e.g., HTML) or operating system interaction (optionally including type and version of the operating system to which the sanitization is directed, like e.g., Linux or Microsoft Windows®).

A sink call event record 340 as shown in FIG. 3*d* may be used to transfer data describing a monitored data sink call from a data sink sensor 127 to an agent 130.

A data sink event record 340 may include but is not limited to a sink call input data section 341, containing references 342 to data objects used as input to the sink call, a sink code location data 343 specifying and identifying code location (method and class name) and context (call stack data) of the performed sink call, and a sink type 344 specifying the type of data sink to which the call was directed (e.g. data base, hypertext document or operating system interaction) and additional data more specifically identifying the called sink (e.g. product name and vendor, hypertext format or type and version of operating system).

The types of sanitizations 334 observed for input/parameter data 342 of monitored sink calls may be analyzed in view of a reported sink type 344 to determine whether input data used for the monitored sink call was correctly sanitized for the called sink type.

Code location data (e.g., entry code location data 302, modification code location data 319, sanitization code location data 333 or sink code location data 343) may, in some embodiments be split into two components, a first, callee component describing the called method that performs input data creation, data modification, data sanitization or data sink interaction code, and a second caller component, describing the application specific code location that performs a call to a input data retrieval, data modification, sanitization or data sink interaction method. As an example, callee data for an input data retrieval method, like a request handling method may identify an application independent library function like "HTTPRequest.getHeaderValue( )" which provides generic functionality to extract a specific header value from a received HTTP request. Caller data may identify the application specific code location which also hints the semantic of the performed activity and also allows to locate the activity in application specific code. Following above HTTP request handling example, such a method may be called "GetUserNameFromRequestHeader( )", which internally calls the function "HTTPRequest.getHeaderValue( )". Callee data may be required to identify a performed data flow/sanitization/data usage activity and caller data may be required to link this activity with the application specific code that performed this activity. With reference to code location data described in FIG. 5, code location 403$a$ with class "RegisterUser" and method "getUserName" would be a typical caller code location, whereas 403$q$ class "VendorADriver" method "executeQuery" would be a typical callee code location. With caller/callee code location reporting corresponding caller/callee counterparts would also be reported. The focus of FIG. 5 is to explain the basic concepts of data flow tracking, introducing the caller/callee reporting concept there would distract the reader unnecessarily from those basic concepts.

Various technologies may be applied to gather callee and caller data. A first variant includes instrumenting the callee method with a sensor, where the sensor acquires a method call stack, which describes the nested method calls that led to the method call detected by the sensor. This method call stack may then be traversed until the first application specific method is found. This first identified application specific method may then be used as caller info data.

A second variant uses a caller instrumentation approach, in which application specific code is scanned for calls to methods corresponding to retrieval of external data, data object modification, sanitization or data sink interactions. Those methods may then be replaced by calls to wrapper versions of the original method calls, which perform monitoring and data flow tracking activities in addition to the originally desired activity. In addition, the call to the wrapped method version may be surrounded by additional instrumented code that gathers metadata (e.g., class and method names, signatures etc.) describing the calling method. This way, the wrapper method may provide data describing the called method (callee data) and the instrumentation surrounding the wrapped method would provide data describing the calling method (caller data). Advantage of this caller side instrumentation is that it does not require to gather call stack data which is an expensive operation in some environments.

In some embodiments data records describing data flow, data modification/sanitization and usage, like 300, 310, 330 and 340, may contain an additional field "origin identifier". The origin identifier may be set on the receipt of a new untrusted data object. If the received data object is processed or used, and new data objects are derived from this data object, the origin identifier may be propagated to data flow records describing those modifications. Such an origin identifier may, on detection of a data sink call that uses untrusted and not sanitized data object, be used to quickly identify the origin of this untrusted/not sanitized data object.

Coming now to FIG. 4, which provides data records that may be used to store security data flow graphs that describes how input data travels through a monitored system, how it gets modified and/or sanitized until it reaches a data sink.

An operation node 400, as described in FIG. 4$a$ may be used to describe an observed operation on tracked input data, like the receipt of input data, its modification, sanitization, or usage to interact with a data sink.

An operation node may contain but is not limited to a node type field, specifying the type of described operation, like source for the receipt of input data, modification for the modification of input data, sanitization for the sanitization of input data and sink for the usage of input data for the interaction with a data sink, an operation type field 402 further describing the observed operation in more detail and code location data 403, describing the location of the observed operation in code (e.g. method and class name) and call context data (e.g. in form of a call stack).

The operation type section 402 may contain additional, operation type specific data that describes the monitored operation. It may e.g., for source operations that describe the receipt of external input, describe the type of interaction that provided the input (e.g., hypertext data request, RMI request), further details describing how the input was extracted from a received request and network endpoint data identifying the network node from which the request was received. For modification operations it may specify the type of performed modification like append, trim, replace or split and for sanitization operations it may specify to which type of data sink the observed sanitization was directed. For sink calls it may specify type and details of the called data sink.

A data node record 410 as described in FIG. 4$b$ may be used to describe data objects that were transferred between different operations.

A data node record 410 may contain but is not limited to a data object snapshot 411 describing a data object that was used by a one or more data operations (described by operation nodes 400) as input or produced as an output and a security metadata snapshot 412 describing the security status of the data object at the point of time when it was used/created by an operation. A security metadata snapshot may be a copy of the security metadata record of a data object at the point in time when the data object was used as input for an operation or created as output of an operation.

As an example, the security metadata record 207 of a given data object may be empty at a specific state of its processing by a monitored system. During the processing, it may pass through a sanitization method, which adds a new sanitization information record to the security metadata record to indicate the new sanitization status.

The sanitization operation may be described using an operation node 400, the input data of the sanitization operation may be described using a data node containing the content of the data object before the sanitization and a copy of its security metadata record before the sanitization. The output of the sanitization operation may be described by a data node 410 containing a copy of the data object after the sanitization in its data object snapshot and a copy of its security metadata record after sanitization in its security metadata snapshot.

A data provision/usage edge 420, which may be used to connect operation nodes 400 and data nodes 410 is shown in FIG. 4$c$. A data provision/usage edge 420 may be used to connect operation nodes with used input data and with created output data. It may contain but is not limited to a source node reference 421 referring an origin node and a destination node reference 422 referring a destination node. For the usage of data as input of an operation, the source node reference may refer a data node 410 corresponding to input data used by an operation and the destination node reference may refer to the operation node 400 describing the operation that was performed on the data. For the creation of data by an operation, the source node reference may refer to the operation node describing the operation that created output data and the destination node reference may point to the data node describing the created data object.

Coming now to FIG. 5, which contains an exemplary security data flow graph that describes the processing of two input data objects from their extraction from a received request, over sanitization and modification operations to a performed data sink operation.

A request may be received by a monitored application that is directed to check whether a specific user that is identified by its name and address is already registered on the system.

The received request may be processed by the two methods "getUserName" and "getAddress" of the class "RegisterUser". Those two methods may be instrumented with source sensors 121 which monitor and report those calls and register the extracted input data for data flow tracking.

Corresponding data nodes 400*a* and 400*i* are created. Node types 401*a* and 401*i* are both set to "source" as those operations describe the receipt of new input data. Operation type data 402*a* and 402*i* further describe the extraction of the new input data. Both input data objects are extracted from HTTP requests, where the first data object "username" is extracted from a HTTP request parameter "username" and the second data object "address" from a HTTP request parameter "address". Code location data 403*a* and 403*i* identifies the code portions that extracted the input data by method name, class name and a line number. The line number may e.g., specify the line number of the source code file containing the called method at which the called method starts.

The output of operation 400*a* is represented by data object 410*c* containing the value of the queried username in its data object snapshot 411*c* and the current security status of the data object in its security metadata snapshot. As the data object was just received from a source method, its security status is still set to "insecure". A data provision/usage edge 420*b* connects operation node 400*a* and data node 410*c* to indicate that operation 400*a* created data object 410*c*.

The execution of the method "getAddress", which created a data object holding the extracted input data for the address is similarly modelled by data node 400*i*, data provision/usage edge 420*j* and data node 410*k*.

A source sensor 121 may be instrumented to the methods "getUserName" and "getAddress". The sensors may detect the execution of those methods and the creation of input data "name" and "address" by those methods and report their monitoring data in form of data source events to the agent 130. The data flow event handler 202 may process those data source events to create operation nodes 400*a* and 400*i*, data provision/usage edges 420*b* and 420*j* and data nodes 410*c* and 410*k*.

The data object that was created by the method "getUserName" is then forwarded to a sanitization method that analyzes data and neutralizes potential harmful portions of the data object. As discussed before, sanitization depends on the type of a used data sink, and in some cases also on the product providing or the vendor of the data sink functionality and sometimes even on the version of the product.

The sanitization method that is used to sanitize the "username" data object is directed to sanitize input data for data sinks of the type data base and for data base products provided by vendor A. The class containing the called sanitization method is "DatabaseVendorACodec", and the name of the called method is "encodeString". This method may scan the received data object and e.g., replace all character sequences that may cause the unintended execution of commands by the receiving data base by character sequences that only represent input data that will be stored in the data base without causing other undesired activities.

Operation node 400*e* represents the execution of the sanitization node, with a node type 401*e* indicating a sanitization operation, an operation type 402*e* indicating the encoding of a string for its usage in an SQL command, and a code location 403*e* section identifying the called method by class name, method name and line number. A data provision/usage edge 430*d* between the data node 410*c* representing the received input data object "username" and the operation node 400*e* representing the sanitization operation indicates that the "username" data object is processed by the sanitization operation. The sanitization operation 400*e* creates a new, sanitized variant of the "username" data object which is now ready for usage in interactions with data base systems provided by vendor A.

Data object 410*g*, containing a snapshot 411*g* of the "username" data object after sanitization and a security status snapshot 412*g* indicating that the described data object is still generally insecure, but that it was sanitized for the usage by data bases provided by vendor A.

A sanitization sensor 123 may be placed in the called sanitization method and create a data sanitization event record 330 which may be received by a data flow handler 202. The data flow handler 202 may on receipt of this event record create operation node 400*e* and data node 410*g* which represents the observed sanitization operation and the sanitized data object created by the sanitization operation. It may further create data provision/usage edge 420*d* which is inserted between data node 410*c* representing the version of the data object before the sanitization and operation node 400*e* representing the performed sanitization operation to indicate that "username" was received by the sanitization method. Data provision/usage edge 420*f* may also be created which connects the operation node representing the sanitization operation with the data object representing the data object created by the sanitization operation.

A data modification operation may then be executed which combines the "address" data object, the sanitized "username" data object, and some constant data objects to create a query command which can be interpreted by a data base system.

The observed data modification operation is represented by operation node 400*m*, with node type 401*m* modification, indicating an operation that modifies data objects, an operating type 402*m* indicating a modification that appends received data objects to create a new data object, and code location data identifying the performed modification operation by class name ("BuildSQLs"), method name ("checkUserExistence") and line number (120).

Data provision/usage edges 420*h* and 420*l* indicate that the data base sanitized version of the "username" data object and the received version of the "address" data object are used as input of the data modification operation.

The result of the observed data modification operation is represented by data node 410*o*, which is connected with the operation node 400*m* representing the data modification operation by data provision/usage edges 420*n*.

Data node 410*o* provides a snapshot 411*o* of the data object created by the observed modification operation and a snapshot 412*o* of its security status.

The data object represented by data node 410*o* may be created by multiple append operations that concatenate two or more data objects to create a new data object.

The first used data object may be a constant string prefix that is used for all data base queries that determine the existence of a user. In this case, the value of this constant is "SELECT*from users where name=", which defines the type of interaction (i.e. a query for already stored data), the queried data (in this case, all data of matching data base records is requested), the origin of the queried data in the data base (in this case, this is the table "users"), and a first portion of filter criteria that define the returned data (in this case "where name=" specifies that returned records must have a "name" field that has a specific value, without defining this specific value). As this constant string is provided by the application, it cannot contain malicious data, therefore its trust/security status is set to "secure constant". The trust/security status 500 of the portion of the resulting data object corresponding to this constant prefix may be represented by a trust information record 209 with a status 210 indicating a trusted constant, an offset 211 of 0, indicating that the resulting data object starts with the prefix constant and a length 212 describing the length of the prefix constant.

The sanitized data object "username", (represented by data object 410*g*) containing the sanitized version of a concrete, specific username may be appended to the prefix string constant. The corresponding security/trust status 501 for this portion of the resulting string is "insecure" because it is derived from user input that is not controlled by the application and the sanitization status is "sanitized for data bases of vendor A". The trust/security status of the portion of the created data object corresponding to the sanitized "username" data object may be described by a trust information record 209 with a status indicating an untrusted data object and the sanitization status of this portion of the resulting data object may be described with a sanitization information record 213 with a status 214 indicating the sanitization for data bases of vendor A. Both trust information record 209 and sanitization information record 214 may have an offset 211/215 value of the length of the constant prefix, indicating the start of the portion of the resulting data object that is described by those records. The length 212/216 of those records may set to the length of the sanitized version of the "username" data object. Offsets 211/214 and lengths 212/215 define the portion of the resulting data object that is described by those trust/security and sanitization records 209/213.

Another application defined constant "'and'", for the conjunction of filter criteria, is appended to the "username" constant. The trust/security status 502 of this portion of the resulting data object is also described by a trust information record 209 with status 210 "trusted constant". The offset 211 of this record is set to the length of previously appended data objects (i.e., length of constant prefix plus length of sanitized "username") and its length 212 is set to the length of the appended conjunction constant.

Afterwards, the "address" data object is appended, and its trust/security status 503 is described with a trust information record 209 with status "untrusted", as this data object was received from a source that is not controlled by the application. Offset and length are set to identify the portion of the resulting data object that corresponds to the appended "address" data object. No sanitization information record is added because the "address" data object was not sanitized.

Finally, the constant "'" is appended to the resulting data object which terminates a character sequence in a data base query command. Its trust/security status 504 is again set to indicate an application controlled constant.

The method "checkUserExistence" of the class "BuildSQLs" may be instrumented with a modification/tracking sensor 125 which monitors the modifications performed by this method and reports them using one or more data modification event records 310.

In some variant embodiments, basic concatenation methods capable to concatenate two data objects may be instrumented with such sensors and those sensors may report the usage of those methods by a "checkUserExistence" method to create a result data object.

In all variants, the data modification event records 310 created by those modification/tracking sensors may indicate the input data that was used by the data modification operation and the impact that specific used input data objects had on a created result data object. Previously recorded trust/security and sanitization status information is mapped to the created result data object.

The created query command data object may then be forwarded to a sink operation, which is represented by operation node 400*q* of type 401*q* sink, with an operation type 402*q* indicating a data base query directed to a data base system provided by vendor A, and with code location data 403*q* identifying a specific method to interact with a data base system by class name ("VendorADriver"), method name ("executeQuery") and line number (350) and by data provision/usage edge 420*p*, which connects the data object 410*o* with the sink operation 400*q* using the data object.

A sink sensor 127 may be instrumented to the sink method which recognizes the call of the sink method and that may also capture the data objects that were passed to the sink method. A corresponding sink call event 340 may be created by the sink sensor and forwarded to the agent 130. The data flow event handler 202 may process the received sink call event and update the security data flow graph by adding data provisioning/usage edge 420*p* and data operation node 400*q*. The sink call event may also be analyzed by the vulnerability analyzer 224, which may detect that the received query data object misses required sanitization for the portion of the query data object that corresponds to the "address" data object.

Coming now to FIG. 6, which provides flow charts of processes that describe the execution of source 121, modification 123 and sanitization sensors 127.

The execution of a source sensor 121 is shown in FIG. 6*a*. Source sensors 121 may be instrumented to methods that extract data from received external requests, like methods that process incoming HTTP requests and extract data from portions of such requests like e.g., query strings, header values or other request portions. Other examples for methods that may be instrumented with source sensors include methods that process remote method invocation requests and that e.g., extract the values of received method call parameters.

The processing performed by a source sensor starts with step 600, when a character sequence or other input data that was received from an untrusted source, e.g., via an incoming request is available, and the extracted input data was captured by the input sensor. As an example, code may be injected to methods that extract data from incoming requests, which uses the extracted data as call parameter for the execution of a source sensor.

Following step 601 may then determine code location data identifying the code portion that received the input data, e.g., in form of a class name a method name and a line number. Step 601 may further determine the type of the source (e.g., hypertext/HTTP request together with the portion of the request that was used to extract the input data or RMI request together with the portion of the RMI request that was used to extract the input data) and create a reference to the created input data object (e.g., a weak reference type as described above). Step 601 may further determine the origin of the request from which the input data was extracted and create a data source event using the previously created and determined input data reference, code location data, source type and origin data. The created source event record 300 may then be sent to the agent 130.

In following step 602, the data flow event handler 202 of the agent may receive the source event record 300 and create a new security metadata entry 207, using the input data reference 301 of the received source data record as input data/reference 208. It may further create a trust information record 209 in the new metadata entry 207 marking the whole input data as untrusted, e.g., by setting its status to "untrusted", its offset to 0 and its length to the length of the received input character sequence or data object. The created security metadata entry 207 may be stored in the security status repository 206.

In subsequent step 603, the data flow event handler 202 may create a new security data flow graph 218 in the security data flow graph repository 217 by creating an operation node 400 describing the observed operation that received the input data, a data node 410 describing the received data and its security status after receipt, and a data provision/usage edge 420 connecting the operation node and the data node. Step 603 may e.g., set the node type 401 of the created operation node 400 to "source" and set its operation type and code location data to the corresponding values of the received data source event (e.g., source type 303 and entry code location data 302). In some variant embodiments, received origin data 304 may also be stored in the created operation node. Data from the previously created security metadata record 207 may be used to initialize the created data node 410 (e.g., a copy of the input data key/reference may be used as data object snapshot and a copy of the trust and sanitization information records 209/213 may be used as security metadata snapshot). The data provision/usage edge may refer to the created operation node as source node reference 421 and to the created data node as destination node reference 422.

The process then ends with step 604.

The processing performed by modification sensors 125 is shown in FIG. 6*b*. Modification sensors may be placed to functionalities providing fundamental modification operations, like operations that concatenate/append data objects, that remove portions from data objects or that split data objects into multiple parts. Examples of such operations for e.g., the Oracle Java® programming language include various method of the class "java.lang.String" that concatenate objects of the type "java.lang.String", like the "concat" method or the "+" operator, methods that split String objects like all variants of "split" methods. Methods of other classes, like the "java.lang.StringBuffer" or "java.lang.StringBuilder" may also be instrumented with modification/tracing sensors 125. Other programming languages like Microsoft's C# or Googles Go language may provide similar basic String/data object modification functions that may also be instrumented with modification/tracking sensors 125.

Multiple variants of modification/tracking sensors may exist, directed to different types of data object modifications. One variant may be directed to modifications that combine input data objects into a result data object, another variant may be directed to monitor the splitting of incoming data objects into multiple result data objects. Other sensor variants may be directed to monitor the replacement of portions of a destination data objects with portions of a source data object. Various other modification/tracking sensors may exist for other data modification variants. Some data object modification methods may generate new data objects as result of their modification operations, other modification methods may perform in-place modifications which change received input data objects. Modification/tracking sensor variants may be available for in-place modifications and for modifications creating new data objects.

The agent 130 may identify and analyze such fundamental data modification functions and methods, e.g., by analyzing class and method name to determine the modification functionality provided by those code portions and select and place the appropriate modification/tracking sensor variant.

All modification/tracking sensor variants have in common that they capture input data objects that are used for the performed modification, parameters that control the performed modifications, the result data object of the modification, and data describing relationship between input data objects and result data objects. Modification/tracking sensors may e.g., create data describing which portion of the content of a specific input data object are contained in which portions of the result data object.

The processing of a modification/tracking sensor starts with step 610, when all input data objects that were used for the modification, all parameters influencing the modification (e.g., for a replace operation offset and length of the to be replaced portion of the result data object) and the result data object have been captured.

For monitored in-place modifications, the modification/tracking sensor may identify the input data object which will be altered by the modification operation and create data allowing to reconstruct the state of to be modified input data object before the modification. Variant embodiments may in this case create a snapshot copy of the input data object before the modification.

Following step 611 may then analyze the security status of the captured input data objects to determine whether at last one of those input data objects has an insecure security status (i.e., was either directly received from untrusted sources, or was created by data modification operations that directly or indirectly used data from untrusted sources). Step 611 may e.g., for each captured input data object, query the security metadata repository 206 for security metadata records 207 with an input data/reference field 208 that matches the captured input data object.

Following decision step 612 terminates the process with step 618 in case no matching security meta data record is found. The absence of matching security meta data records 207 indicates that no input data object of the observed modification operation is untrusted. As it is extremely unlikely that a modification using only trusted data objects as input creates a malicious result object, subsequent data flow tracking is omitted in this case.

In case at least one input data object used by the monitored data modification operation has a security status, step 613 is executed, which analyzes modification type and modification parameters to determine whether the result of the performed modification contains data from an untrusted data object. As an example, a data modification operation that selects a portion of a received input data object as result data object, may receive an input data object that has a security status indicating that only a subset of the input data is insecure. If the modification operation only selects secure portions of the partially insecure input object as result object, then the result object contains no insecure data.

In case the result data object contains no insecure portions, decision step 614 terminates the process with step 618.

Otherwise, step 615 is executed which creates a data modification event record 310 that describes the observed data modification. Data identifying the code location of the performed modification operation (e.g., name of executed modification operation and name of class containing the operation) may be created in step 615 and stored in the modification code location data section 319 of the created data modification record 310. A modification type 320 may be determined and stored, e.g., by analyzing previously captured code location data, and a reference to the modification result data object may be created and stored as modification result data reference 318 in the modification result section.

Further, a modification input data record 312 may be created for each input data object that was used by the modification operation that influenced the created result data object. Step 615 may analyze the type of the modification operation, modification parameters and each used input data object to create corresponding modification input data records 312. First, a reference to the specific input data object may be stored in the modification input data reference 313 of the created modification input data record 312. Then modification type, modification parameters and the input data object may be analyzed to determine which portions of the input data object map to which portions of the result data object. Step 615 may e.g., determine and store a source offset 314 and a source length 315 identifying a specific portion of the input data object. Further, step 615 may determine a destination offset 316 which specifies, together with the source length, the portion of the result data object to which the portion of the input data object defined by source offset and length was mapped. Created modification input data records 312 may be stored in the modification input section 311 of the created data modification event record 310 and the created the created data modification event record may then be sent to the agent 130.

The data flow event handler 202 of the agent may receive the modification event record 310 and in step 616 create a new security metadata record 207 and set its input data key/reference field to the modification result data reference 318 that it received with the modification event record. Further, the data flow event handler may calculate the security and sanitization status of the new result data object by merging the result and sanitization status of all input data records that were involved in the creation of the result data object.

Step 616 may use the modification input data references 313 of modification input data records 312 received with the modification event record to query the security status repository for corresponding security metadata records 207. Afterwards, step 616 may use source offset 314 and length 315 data to identify and select those trust 209 and sanitization information records 213 that overlap with the source portion of the input data object. Data of the selected trust and sanitization information records may then be combined with the destination offset 316 to create trust and sanitization information records for the security metadata record of the result data object. In a concrete example, a received modification data record may e.g., specify that a result data object was created by the concatenation of a trusted constant with an untrusted input data object. Source offset for the input data object may be 0, source length may be equal to the length of the untrusted input data object and destination offset may be equal to the length of the trusted constant. Trust information and sanitization records for the result object may e.g., be created by first copying the trust information and sanitization records of the untrusted input data object and then changing the offset 211/214 of the copied trust information and sanitization records to the received destination offset 316, to align the new trust information and sanitization records with the position of the untrusted input data in the result data object.

Afterwards, step 617 may be executed, in which the data flow event handler updates the security data flow graph to which the observed modification operation belongs. Step 617 may first create an operation node 400, with node type indicating a data modification, operation type 402 describing the performed operation in detail (e.g., concatenation, split, replace etc. including operation parameters), and code location data 403. Corresponding data may be fetched from the received data modification event record 310. Afterwards, a data node 410 may be created for the result object and created operation and data node may be connected with a data provision/usage edge indicating that the data described by the data node was created by the operation described by the operation node. Step 617 may then identify the data nodes 410 corresponding to input data objects used by monitored modification operation. Step 617 may e.g., compare data object snapshots 411 of existing data nodes with received input data references 313. So identified data nodes 410 may then be connected with the new created operation node by data provision/usage edges 420 indicating that the identified data objects are used as input for the modification operation.

Step 617 may, in some cases, also connect previously disconnected security data flow graphs. See e.g., the operation node 400*m* in FIG. 5. In this case, the receipt of the "username" and the "address" input data objects created two independent security data flow graphs, which were then connected by operation 400*m*, which used both data objects to create a result data object.

Afterwards step 617, the process ends with step 618.

Coming now to FIG. 6*c*, which describes the processing performed by a sanitization sensor. Sanitization sensors are placed into sanitization methods that receive input data, analyze the input data for character sequences or other data that may be harmful for a specific data sink and then create a sanitized version of the input data in which the potential harmful portions of the received input data are neutralized. Sanitization methods may either create new versions of sanitized input data objects or may neutralize harmful data portions in-place in received input data objects.

Agents may use metadata of loaded code, like class and method names to identify sanitization methods and then place sanitization sensors in those methods. The code metadata used to identify sanitization methods may also be used to determine to which type of data sink (e.g., data base system, hypertext document, operating system interaction) the provided sanitization is directed. During the instrumentation of sanitization methods, the agent may create code that provides sanitization sensors with the type of the performed sanitization.

The processing of a sanitization sensor starts with step 620, when a sanitization method is executed, and the instrumented sanitization sensor captured the received input data object that should be sanitized, received the sanitization type, and also captured the result data object of the sanitization operation. For sanitization operations that perform in-place sanitization, the sanitization sensor may have captured a version of the input data object before the sanitization operation was performed.

Following step 621 may use the captured input data object to query the security metadata repository 206 to determine whether a security metadata record 207 for the input data object exists which indicates that the input data object contains untrusted data. In case no such security metadata record exists, following decision step 622 terminates the process with step 626.

Otherwise, step 623 is executed which creates a new sanitization event record 330 and initializes its sanitization type 334 to indicate the type of the performed sanitization, its sanitization code location data 333 to identify the performed sanitization method and to refer sanitization input data object 331 and sanitization result data object 332. The created sanitization event record 330 is then forwarded to the data flow event handler 202.

In subsequent step 624, the data flow event handler 202 uses the received sanitization event record 330 to update the security status repository 206. Step 624 may create a new security metadata record 207 and set its input data key/reference to the reference to the sanitized data object 332 that was received with the sanitization event record 330. Step 624 may then copy the trust 207 and security information records 213 of the security metadata record corresponding to the input data object used by the sanitization operation to the new created security metadata record 207. Afterwards a new sanitization information record 213 may be created in the new security metadata record 207 indicating the observed sanitization operation (e.g., sanitization information record with status 214 indicating the performed sanitization, offset 215 set to 0 and a length 216 set to the length of the sanitized data object, to indicate that the whole data object was sanitized).

Security data flow graph data is updated by the data flow event handler 202 in subsequent step 625 to also contain the observed sanitization operation. The data flow event handler may first create an operation node 400 representing the performed sanitization and a data node 410 representing the sanitized data object. Then, it may create data provisioning/usage edge records 420 to connect the sanitization operation node with the data node representing the received input data and with the data node representing the created sanitized version of the input data.

The process then ends with step 626.

Sanitization operations may in some cases use escape characters to neutralize potential malicious data sequences. Those escape characters may be added to the original data code, which generates a sanitized version of a data object that has a larger size than the original received data object. Previously existing trust or sanitization information records that existed for the original data object may need to be adapted corresponding to the size change of the sanitized version of the data object before they can be used to describe the trust and sanitization status of the sanitized version of the data object.

Coming now to FIG. 7, which provides flow charts of processes performed by sink sensors 127, vulnerability analyzer 224 and attack detector 225.

The execution of a sink sensor 127 is described in FIG. 7*a* and starts with step 700, when a sink method is executed, which also causes the execution of an instrumented sink sensor. The sink sensor captures the parameters of the sink call and determines the type of data sink (data base, hypertext document, operating system interaction) to which the called sink method is directed.

Following step 701 queries the security status repository 206 for security metadata records 207 with input data key/references 208 matching the captured sink call parameters and which indicate that the sink call parameters contain untrusted data.

Subsequent decision step 702 terminates the process with step 706 if no corresponding security metadata records were found. Otherwise, step 703 is executed, which creates a sink call event record 340 to indicate the observed sink call execution.

References 342 to the sink call parameters may be captured and stored in the sink input data section 341 of the created a sink call event record. Further, code location data (class and method name) of the called sink method may be captured and stored in the sink code location data section 343 and the sink type 344 may be set to indicate the type of the data sink addressed by the called sink method. The created sink call event record may then be forwarded to the agent 130.

In following step 704 the data flow event handler 202 may process the received sink call event record to update security data flow graph data, e.g., by creating an operation node 400 representing the sink call and further creating data provision/usage edge records 420 that connect the new sink call operation node 400 with data nodes 410 representing the parameters of the sink call.

Afterwards, step 705 is executed, in which the sink call processor 223 analyzes the reported sink call, the security status of used call parameters and the values of those parameters to analyze the vulnerability status of the addressed sink and to determine whether the received input data parameters contain malicious data. Those processes are described in more detail in FIGS. 7*b* and 7*c*.

The process then ends with step 706.

Coming now to FIG. 7*b* which describes the analysis of security and sanitization status data of input or parameter data of an observed data sink call by a vulnerability analyzer 224.

The process starts with step 710 when data describing an observed sink call, including type of addressed data sink, parameter values of performed sink call and security metadata of those parameter values is received by the vulnerability analyzer 224.

Following step 711 may analyze the received security and sanitization metadata to determine whether all portions of parameter values used for the sink call that were received from untrusted sources were also sanitized for the addressed data sink. Step 711 may e.g., first fetch security metadata records 207 for all sink call parameters. From those metadata records 207, step 711 may afterwards fetch trust information records 209 with a status indicating an origin form an untrusted source. Offset 211 and length 212 of the fetched trust information status records describes those sections of the parameter values of the sink call that contain untrusted data. Step 711 may afterwards fetch sanitization data records 213 with a status 214 indicating a sanitization type matching the type of the addressed sink, and then analyze offset 215 and length 216 of those sanitization data records to determine whether they cover all portions of untrusted data identified by fetched trust information records 209. In case step 711 determines that all untrusted input data sections were correctly sanitized for the received sink, following decision step 712 may terminate the process with step 716.

Otherwise, step 713 may be executed, which fetches security data flow graph data 218 for those sink call parameters that missed required sanitization. Further, step 713 may create a report message 229 and set its severity indicator to indicate a vulnerability.

Following step 714 analyzes the fetched security data flow graph data to determine whether equivalent security data flow graph data has already been reported. In case an equivalent security data flow graph data has already been reported previously, only an identifier of this equivalent security data flow graph data may be stored in the data flow information section 231 of the created report message. Otherwise, the whole fetched security data flow data 218 may be stored there. A detailed description of this deduplication process can be found in FIG. 9.

Afterwards step 715 may send the created report message 229 to a monitoring server 136 for analysis and the process ends with step 716.

Coming now to FIG. 7*c*, which describes the processing performed by an attack detector 225 to determine whether parameter values of an observed sink call contain malicious data sequences and therefore represent an attack.

The process starts with step 720, when the attack detector 225 receives data describing an observed data sink call, like trust and sanitization data of parameters used for the sink call, the values of those parameters and the type of the addressed data sink. Following step 721 may analyze the trust data for the parameters to identify those sections of the parameters that were received from untrusted sources.

Afterwards, step 722 may perform a sink type specific analysis of the parameter value sections identified by step 721 to determine whether those parameter value sections contain malicious data.

Subsequent decision step 723 terminates the process with step 729 in case no malicious data was identified.

Step 724 is executed otherwise, which fetches corresponding security data flow graph data, creates a report message, and sets its severity indicator 230 to indicate an attack. Step 724 may also perform deduplication measures for security data flow graph data as described in FIG. 8.

Following decision step 725 analyzed configuration data to determine whether countermeasures against detected attacks are configured. Such countermeasures may be configured on data sink type basis, on agent instance basis, per process type, operation system type, per application, or globally.

In case no counter measures are configured, the process continues with step 728. Otherwise, the configured attack countermeasure may be performed in step 726. Such countermeasures may contain but are not limited to a neutralization of identified malicious data sections followed by an execution of the sink call using the neutralized data, suppression of the sink call and continuing execution, or terminating execution before the sink call with a specific exception. Step 727 may gather countermeasure report data, like e.g., the values of parameter values containing data that was neutralized by a countermeasure.

Countermeasures may also be directed to potential future attacks, by e.g., analyzing the origin of the detected attack and suppressing future requests from the same origin. Such countermeasures may be applied locally by the agent, or they may be orchestrated by the monitoring server 136, which may on receipt of a report indicating an attack from a certain origin, instruct all connected agents to suppress future requests from this origin.

Following step 728 may then add countermeasure report data to the report message created by step 724 and afterwards sent the report message to the monitoring server for alerting and analysis.

The process then ends with step 729.

The processes shown in FIGS. 7 and 8 describe the processing of various data flow activities detected by placed sensors, where the processing is performed in form of a cooperation between a specific sensor 121, 123, 125 or 127 and an agent 130. Although the form of cooperation between sensors and agents as described in FIGS. 7 and 8 was considered as the most reasonable way to distribute processing activities between sensors and the agent, also other ways of distribution are possible, and may in some situations be more efficient than the ones described in FIGS. 7 and 8. Some processing steps described in those figures as being executed by a sensor may be processed by the agent instead or vice versa.

Coming now to FIG. 8, which provides flow charts for agent side and server side deduplication measures that identify and eliminate already sent or reported data flow or vulnerability data.

FIG. 8*a* describes the agent side deduplication process, which identifies vulnerabilities reported by the agent and reduces the amount of sent monitoring data for repetitively detected vulnerabilities.

The process starts with step 800, after a vulnerability of a data sink call was detected and monitoring data describing the vulnerability, e.g., in form of a security data flow graph was fetched. Following step 801 may remove sink call instance specific data from the security data flow graph, like offset and index data of trust and sanitization status data stored in the received security data flow graph and also remove all data object snapshots 411 of data nodes 410 in the security data flow graph. The result of step 801 is a version of the security data flow graph that describes the structure of the data flow that led to the vulnerability, without containing data that is specific for the single, observed vulnerable sink call. This version of the security data flow graph may also be called vulnerability data flow structure graph (VDFSG). As VDFSGs only describe the structure of the data flow that led to a detected vulnerability, without containing data that is specific for an individual vulnerable sink call, they may be used to identify equivalent vulnerabilities.

Following step 802 may create identification data for the previously created VDFSG, e.g., by calculating a hash value from the data representing the VDFSG. Following step 803 may query a VDFSG identification data repository (not shown) maintained by the agent that contains identification data of previously observed VDFSGs for the VDFSG identification data created in step 803.

Decision step 804 continues with step 805 if a matching entry was found in the VDFSG identification data repository, which indicates that a structurally equivalent security data flow graph 218 has already been reported before.

Step 805 indicates an already seen vulnerability and suppresses the sending of the full vulnerability data containing corresponding security data flow graph data. Step 805 may instead send a report message indicating an already seen vulnerability, possibly containing the VDFSG identification data created by step 802. Such reporting may be used by a receiving monitoring server to determine the usage frequency of execution or data paths to sinks that are affected by vulnerabilities, which may e.g., be used to prioritize those vulnerabilities. The process then ends with step 808.

In case the VDFSG identifier created by step 802 was not found in the VDFSG identification data repository, decision step 804 continues the process with step 806, which inserts the created VDFSG identifier into the VDFSG identification data repository. Following step 807 may indicate a new type of vulnerability, which causes the sending of full vulnerability monitoring data including corresponding security data flow graph data 218. The process then ends with step 808.

The deduplication of vulnerability monitoring data by a receiving monitoring server 136 is shown in FIG. 8*b*. The process starts with step 810, when the monitoring server receives a vulnerability report message from an agent 130 indicating a newly detected vulnerability containing a security data flow graph 218. Following step 811 may generate a VDFSG from the received security data flow graph and extract VDFSG identification data as already discussed in FIG. 8*a*. In case the monitoring server receives a report message indicating a vulnerability that was already reported by the agent, the monitoring server may, instead of executing step 811, directly use the VDFSG identification data received from the agent 130.

Following step 812 may query a global VDFSG identifier repository (not shown) maintained by the monitoring server for the generated or received VDFSG identifier. The global VDFSG identifier repository may contain VDFSG identifiers that were received from all agents.

Following decision step 813 continues with step 815 if the new VDFSG identifier was not found in the global VDFSG identifier repository.

Step 815 updates the global VDFSG identifier repository by inserting the new VDFSG identifier. Subsequent step 816 may then insert the new VDFSG identifier also in an agent specific VDFSG identifier repository, which contains only VDFSG identifiers of the agent from which the vulnerability report was received. The monitoring server may maintain such agent specific VDFSG identifier repositories for all connected agents.

Agent side VDFSG identifier repositories may be cleared on a restart of the process monitored by the agent. Therefore, agents may incorrectly report vulnerabilities that were already reported before the restart as new ones. The agent specific VDFSG identifier repositories that are maintained by the monitoring server may be used to correct this issue. The agent specific VDFSG identifier repositories may also be used to determine the number of monitored processes that are affected by a specific vulnerability identified by a VDFSG identifier. The number of agent specific VDFSG identifier repositories containing the specific VDFSG identifier may be determined, and this number may be used to prioritize the vulnerability identified by the VDFSG identifier.

Following step 817 may then report that a new vulnerability was detected on the specific agent. Afterwards the process ends with step 820.

In case the extracted or received VDFSG identifier is not present in the global VDFSG identifier repository, decision step 813 continues with step 814, which queries the agent specific VDFSG identifier repository for the agent from which the report was received for the extracted or received VDFSG identifier.

Following decision step 818 terminates the process in case the VDFSG identifier already exists in the agent specific VDFSG identifier repository. Otherwise, it executes step 819, which indicates that a vulnerability that was already seen and reported by other agents was now also observed by the agent that sent the vulnerability report. The process then ends with step 820.

Coming now to FIG. 9, which illustrates some exemplary analysis tasks that may be performed on monitored security data flow graph data.

FIG. 9*a* describes a process that performs a continuous integration and aggregation of VDFSGs to create a comprehensive model of the observed vulnerability status. The process may e.g., identify different VDFSGs that terminate at the same data sink and then merge such VDFSGs to generate data representing the overall vulnerability status of the addressed sinks.

The process starts with step 900, when a new VDFSG is received. Following step 901 may determine the data sink that is addressed by the VDFSG, and subsequent step 902 may query a VDFSG repository (not shown) maintained by e.g., a monitoring server 136 which contains previously received VDFSGs for an existing VDFSG that addressed the same data sink as the new received VDFSG.

In case such a VDFSG is found, following step 903 may merge the new VDFSG with the existing VDFSG using the same data sink. Step 903 may e.g., remove the operation node 400 representing the performed data sink call and replace it with a reference to the operation node 400 representing the data sink call of the already existing VDFSG.

Subsequent step 904 may then store the received VDFSG in the VDFSG repository. The process then ends with step 905.

This process incrementally creates VDFSGs that accumulate all data flow paths to observed data sinks that are vulnerable, e.g., because required sanitization is missing.

Data sinks affected by vulnerabilities may be prioritized by the number of different VDFSGs that describe a path to them.

In variant embodiments, VDFSGs may not be aggregated by equal or equivalent sink calls, but by equal or equivalent data sources. Those variant aggregations may be used to identify those untrusted data sources that affect the most data sinks. Data sources that are identified as the origin of vulnerabilities may in such embodiments be prioritized by the number of data sinks they affect.

The process may also consider the number of times that VDFSGs are reported (i.e., number of times that observed vulnerable data flows use the same path, which is represented by identical VDFSGs) by adding a weight to each VDFSGs in the VDFSG repository which represents the number of times a security data flow matching the VDFSG was observed.

Coming now to FIG. 9*b*, which describes a flow chart that performs a prioritization of data sinks that are affected by vulnerabilities by the number of different vulnerable paths that hit those data sinks, as briefly discussed above.

The process starts with step 910, either cyclically or on user request. Following step 911 analyzes the aggregated VDFSGs, that were e.g., created as described in FIG. 9*a*, to identify the data sinks calls contained in those VDFSGs.

Following step 912 may then trace all data flow graphs of previously identified data sinks backwards until a data source is reached to determine for each sink the number of different data sources from which they may receive malicious data.

Step 913 may then prioritize the identified data sinks by the number of data sources from which they may receive malicious data and following step 914 may then provide a prioritized vulnerability report which is presented to a user of the monitoring system. The process then ends with step 915.

FIG. 9*c* sketches a process that may be used to create suggestions to place missing sanitization code for identified vulnerabilities. Placing sanitization code in an application requires to change its source code, which always imposes a risk to introduce new errors or bugs to the application. Therefore, it is desired identify a position for new added sanitization code that fixes as much vulnerable paths as possible with as less code changes as possible. Aggregated VDFSGs, as e.g., created by the process described in FIG. 9*a* may be used to identify optimal places to add missing sanitization code.

The process starts with step 920, e.g., when a user selected a specific vulnerable data sink and requested suggestions for the placement of missing sanitization code.

Following step 921 may trace the aggregated VDFSG of the selected data sink backwards, until a first branch in the VDFSG is detected. All nodes of the VDFSG between the first branch and the data sink are passed by all vulnerable paths to the data sink. Appropriate sanitization code that is placed in the area between the sink and the first incoming branch covers all vulnerable paths to the data sink. Placement of sanitization code placed in this area is therefore optimal in terms of required code changes as it provides the best effect with a minimal effort/risk factor because it fixes all vulnerabilities of the data sink with most probably a single, local change of the source code.

Following step 922 may select the operation nodes of the VDFSG that are located between the detected first branch and the operation node representing the sink call (including the operation node representing the sink call) and subsequent step 923 may recommend the code locations of the selected operation nodes as candidates to place sanitization code. The process then ends with step 924.

Coming now to FIG. 10, which illustrates a situation where two portions of a monitored application are executed on different processes and where the first process receives untrusted input data and then performs sanitization for a specific type of data sink. The sanitized data is forwarded to the second process which then uses the input data from the first process to perform the sink call. Agents are deployed to both processes, which individually and independently monitor the flow of the input data through the processes.

As the agent deployed to the second process is not aware of the sanitization performed on the first process, it may incorrectly report a vulnerability. In cast the deployed agents not only monitor the flow of input data, but also the execution of distributed transactions, they may also generate transaction trace data that shows the communication between the two processes which sends the input data that was sanitized by the first process to the second process for usage in a sink call.

The combined data flow and transaction trace monitoring data may be used by a global security status analyzer 1019 situated on a monitoring server to detect the dependency between the sanitization performed on the first process and the sink call performed on the second process and to further suppress an incorrect vulnerability report generated by the agent deployed to the second process.

An insecure input 1010 may be received by a request handling method 104*a* on process A 100*a*. Sensors may be deployed to the request handling method, which report 122*a* the receipt of the insecure input data to agent A 130*a* deployed to process A.

The insecure input data may be forwarded 1011 to a sanitization method 105*a* for data sinks of type X, which is also instrumented with a sensor which reports 124*a* the sanitization of the input data to the agent. The sanitized input data is forwarded 1012 to an outgoing inter process communication method 1000, which may also be instrumented by a sensor, which reports the usage of the sanitized input data by the outgoing inter process communication method. Data flow monitoring performed by agent A 130*a* ends here, but the sensor paced to the outgoing inter process communication method may also create transaction tracing data and report 1001 the outgoing inter process call. The sensor may also alter the communication message of the inter process call by adding correlation data 1014 which may be used to identify matching sender and receiver side transaction trace data for a monitored inter process communication. The correlation data 1014 may also contain a data flow identifier 1015 which identifies the recorded data flow for the sanitized input data used by the inter process communication.

The agent 130*a* may report the observed data flow 129*a* of the received input, and transaction trace data describing the observed outgoing inter process communication 1018*a*. The reported transaction trace data may also contain data identifying the status of the input data (i.e., sanitized for data sinks of type X) when it was used for the outgoing inter process call. The agent 130*a* may sent its reporting data to the monitoring server via a secured communication link.

The created inter process communication message may be transferred to process B 100*b* via an insecure or secure connection, depending on the configuration of the monitored application.

A method 1002 to handle incoming inter process communication messages may be instrumented with a sensor, which detects an incoming call 1017, extracts correlation data 1014 of the received message and reports it to agent B 130*b*. The agent may forward 1018*b* this transaction tracing data to the monitoring server 136. The sensor may also report 122*b* the receipt of, from the point of view of agent B 130*b*, insecure input data. The received input data may be used 1016 to perform a sink call 107*a*, which is reported by a placed sensor to agent B 130*b*. As agent B did not record a sanitization of the received input data for sinks of type X, it reports 129*b* a vulnerability of the data sink to the monitoring server 136. Agent B 130*b* may also use a secured network connection to send data to the monitoring server.

The monitoring server receives data flow monitoring and transaction tracing data and generates end-to-end transaction tracing data describing the dependencies between the processing performed on process A and on process B. This end-to-end tracing data also reveals that the data used for the sink call observed on process B was previously correctly sanitized on process A. A global security status analyzer 1019 operating on the monitoring server may analyze corresponding transaction trace and data flow data to identify and eliminate incorrectly reported vulnerabilities.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware, or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for identifying a security vulnerability in an application executing across processes on a host computing device in a distributed computing environment, comprising:

reporting, by a source sensor, input data received by a frontend portion of the application to a first agent, where the input data is received from a source external to the host computing device, the source sensor is instrumented in a request handling method of the frontend portion of the application, and the frontend portion of the application and the first agent are executed on a first process;

reporting, by a sanitization sensor, sanitization of the input data to the first agent, where the reporting of the sanitization is in response to execution of a data sanitization method within the frontend portion of the application and the sanitization sensor is instrumented in the data sanitization method;

reporting, by a first communication sensor, usage of the input data to the first agent by an outgoing communication method, where the first communication sensor is instrumented in the outgoing communication method;

reporting, by the first agent, first observation data to a monitoring server, where first observation data includes an indicator of the sanitization of the input data and usage of the input data by the outgoing communication method, and the monitoring server is located remote from the host computing device;

reporting, by a second communication sensor, receipt of the input data by a backend portion of the application to a second agent, where the backend portion of the application and the second agent are executed on a second process which differs from the first process;

reporting, by a sink sensor, a sink call made by the backend portion of the application to the second agent, where the reporting of the sink call is in response to execution of the sink call and the execution of the sink call uses at least a portion of the input data reported by the second communication sensor; and determining, by the second agent, whether parameter values for the sink call were sanitized and identifying a security vulnerability in the backend portion of the application in response to a determination that at least a portion of one parameter value for the sink call was not sanitized.

2. The method of claim 1 further comprises reporting, by the second agent, the security vulnerability to the monitoring server; and ignoring, by the monitoring server, the security vulnerability based on the indicator of the sanitization of the input data received from the first agent.

3. The method of claim 1 further comprises linking, by the monitoring server, the second observation data to the first observation data using correlation data, where the first observation data further includes the correlation data and the second observation data further includes the correlation data.

4. The method of claim 3 further comprises adding, by the first communication sensor, the correlation data to messages sent by the outgoing communication method.

5. The method of claim 4 further comprises extracting, by the second communication sensor, the correlation data from the messages and reporting the correlation data to the second agent.

6. The method of claim 1 further comprises determining, by the second agent, a path taken by the input data from the request handling method to the sink call; removing, by the second agent, non-static data from the path to create static path data; computing, by the second agent, a hash value from the static path data; and storing, by the second agent, the hash value in a data store accessible to the second agent.

7. The method of claim 6 further comprises identifying, by the second agent, a second security vulnerability; computing, by the second agent, a second hash value for the second security vulnerability; and comparing, by the second agent, the second hash value to the hash value stored in the data store.

8. The method of claim 7 further comprises reporting, by the second agent, only the second hash value to the monitoring server in response to a match between the second hash value to the hash value stored in the data store; and reporting, by the second agent, the second security vulnerability to the monitoring server in response to a mismatch between the second hash value to the hash value stored in the data store, where the reporting of the second security vulnerability includes an indicator for the sink call and at least a portion of one parameter value for the sink call was not sanitized.

9. The method of claim 1 further comprises reporting, by the second agent, second observation data to the monitoring server, where the second observation data includes receipt of the input data and an indicator of the sink call using the received input data; and determining, by the monitoring server, whether parameter values for the sink call were sanitized and identifying a security vulnerability in the application in response to a determination that at least a portion of one parameter value for the sink call was not sanitized.

10. The method of claim 1 further comprises receiving, by the first agent, bytecode for the application; and instrumenting, by the first agent, the bytecode with at least one of the source sensor, the sanitization sensor and the first communication sensor.

11. The method of claim 1 wherein the request handling method extracts data from an incoming HTTP request.

12. The method of claim 1 further comprises receiving, by the second agent, bytecode for the application and instrumenting, by the second agent the bytecode with at least one of the second communication sensor and the sink sensor.

13. A computer-implemented system for identifying a security vulnerability in an application executing across processes on a host computing device in a distributed computing environment, comprising:

a source sensor instrumented in a request handling method of a frontend portion of the application and configured to report input data received by the frontend portion of the application to a first agent, where the input data is received from a source external to the host computing device, and the frontend portion of the application and the first agent are executed on a first process;

a sanitization sensor instrumented in a data sanitization method within the frontend portion of the application and configured to report sanitization of the input data to the first agent;

a first communication sensor is instrumented in an outgoing communication method and configured to report usage of the input data by the outgoing communication method to the first agent;

wherein the first agent is implemented by computer program instructions executed by a processor of the host computing device and reports first observation data to a monitoring server, where first observation data includes an indicator of the sanitization of the input data and usage of the input data by the outgoing communication method, and the monitoring server is located remote from the host computing device;

a second communication sensor configured to report receipt of the input data by a backend portion of the application to a second agent, where the backend portion of the application and the second agent are executed on a second process which differs from the first process; and a sink sensor configured to report a sink call made by the backend portion of the application to the second agent, where the reporting of the sink call is in response to execution of the sink call and the execution of the sink call uses at least a portion of the input data reported by the second communication sensor;

wherein the second agent determines whether parameter values for the sink call were sanitized and identifies a security vulnerability in the backend portion of the application in response to a determination that at least a portion of one parameter value for the sink call was not sanitized.

14. The computer-implemented system of claim 13 wherein the second agent reports the security vulnerability to the monitoring server; and the monitoring server ignores the security vulnerability based on the indicator of the sanitization of the input data received from the first agent.

* * * * *